US012362826B2

(12) United States Patent
Shearer et al.

(10) Patent No.: US 12,362,826 B2
(45) Date of Patent: Jul. 15, 2025

(54) OPTICAL FREQUENCY SPECTRAL OPTIMIZATION IN DENSE WAVELENGTH DIVISION MULTIPLEXING (DWDM) FLEX GRID SYSTEMS

(71) Applicant: Level 3 Communications, LLC, Broomfield, CO (US)

(72) Inventors: James E. Shearer, Jenks, OK (US); Paul M. Johnson, Littleon, CO (US)

(73) Assignee: Level 3 Communications, LLC, Denver, CO (US)

( * ) Notice: Subject to any disclaimer, the term of this patent is extended or adjusted under 35 U.S.C. 154(b) by 279 days.

(21) Appl. No.: 18/126,167

(22) Filed: Mar. 24, 2023

(65) Prior Publication Data

US 2024/0235677 A1    Jul. 11, 2024

Related U.S. Application Data

(60) Provisional application No. 63/479,502, filed on Jan. 11, 2023.

(51) Int. Cl.
*H04B 10/00* (2013.01)
*H04B 10/112* (2013.01)
*H04J 14/02* (2006.01)
*H04J 14/00* (2006.01)

(52) U.S. Cl.
CPC ...... *H04B 10/1129* (2013.01); *H04J 14/0201* (2013.01)

(58) Field of Classification Search
CPC ............... H04J 14/0227; H04J 14/0238; H04J 14/0241; H04J 14/0254; H04J 14/0256; H04J 14/0257; H04J 14/026; H04J 14/0261; H04J 14/0263; H04J 14/02762
See application file for complete search history.

(56) References Cited

U.S. PATENT DOCUMENTS

| | | | |
|---|---|---|---|
| 2007/0172237 A1* | 7/2007 | Risbood | H04J 14/021 398/59 |
| 2009/0142056 A1* | 6/2009 | Bernstein | H04L 45/00 398/49 |

* cited by examiner

*Primary Examiner* — Daniel G Dobson

(57) ABSTRACT

Novel tools and techniques are provided for implementing optical frequency spectral optimization in dense wavelength division multiplexing ("DWDM") flex grid systems. In various embodiments, based on a determination that one or more gaps of optical spectrum exist in a range of optical spectrum that contains one or more media channels that support transmission of corresponding one or more first signals, a computing system may determine a network wavelength service frequency assignment for shifting frequency of at least one media channel among the one or more media channels to optimize one or more spacings among the one or more media channels in the range of optical spectrum for supporting transmission of one or more second signals; and may cause one or more optical signal devices to shift a center frequency of each of the at least one media channel, based on the determined network wavelength service frequency assignment.

18 Claims, 13 Drawing Sheets

Drift Method

Bridge and Roll by NMC

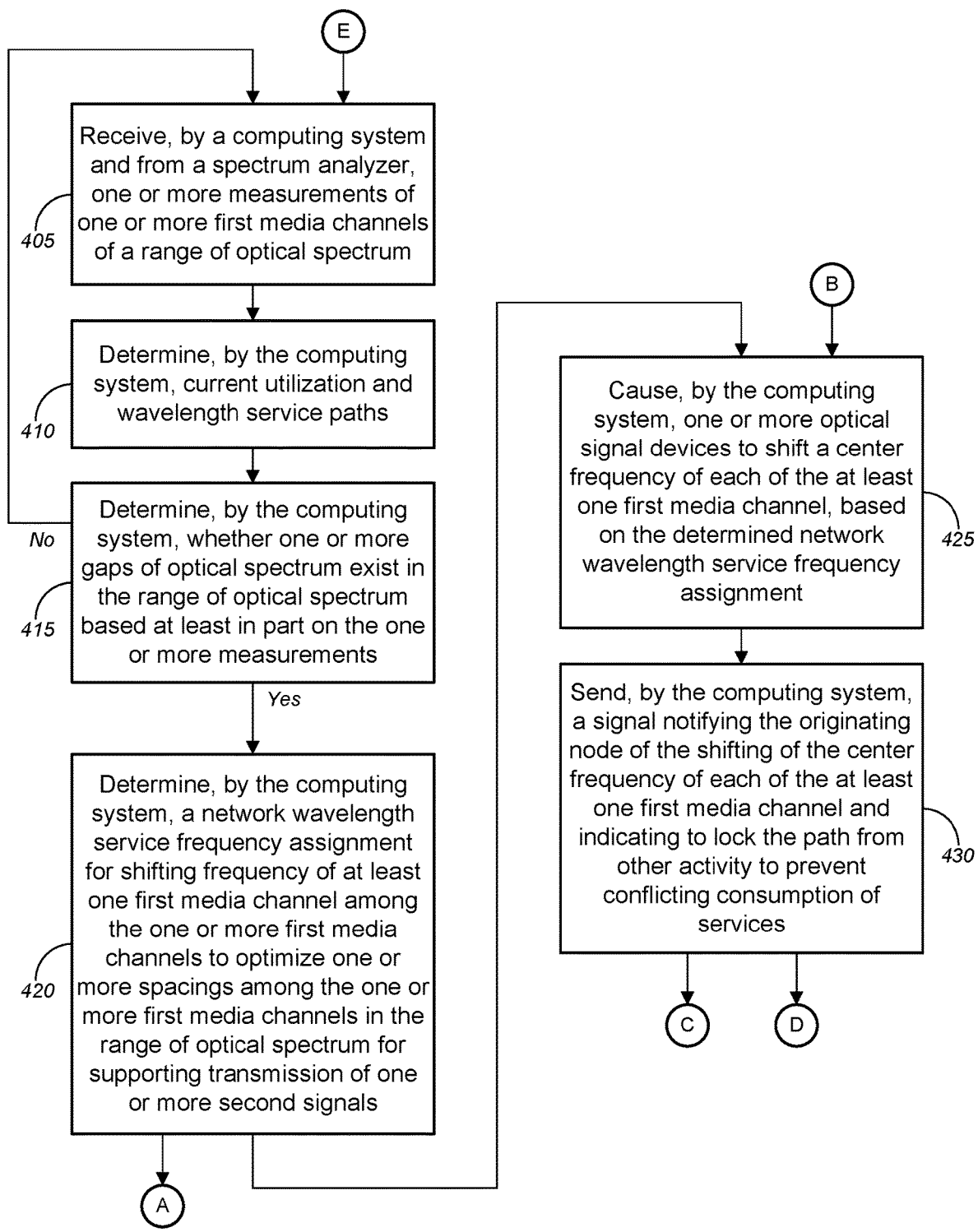
Fig. 4A    400

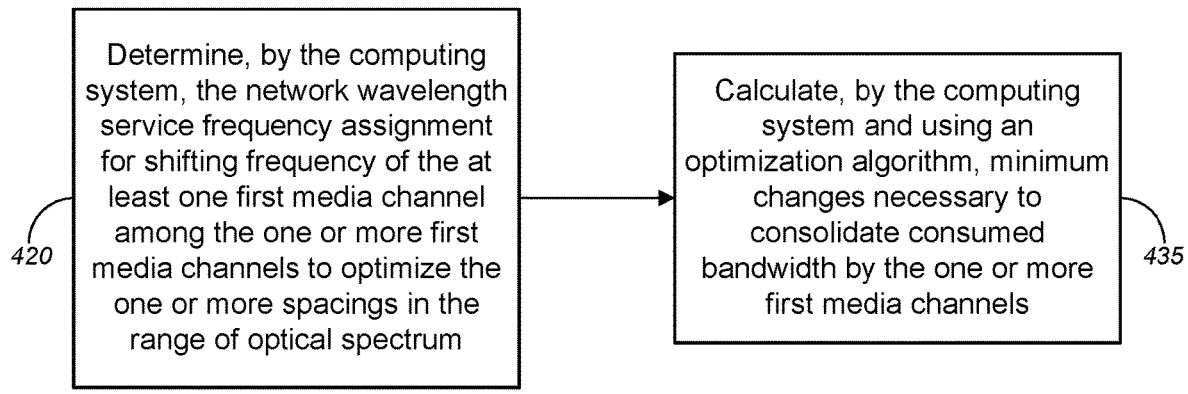
Fig. 4B
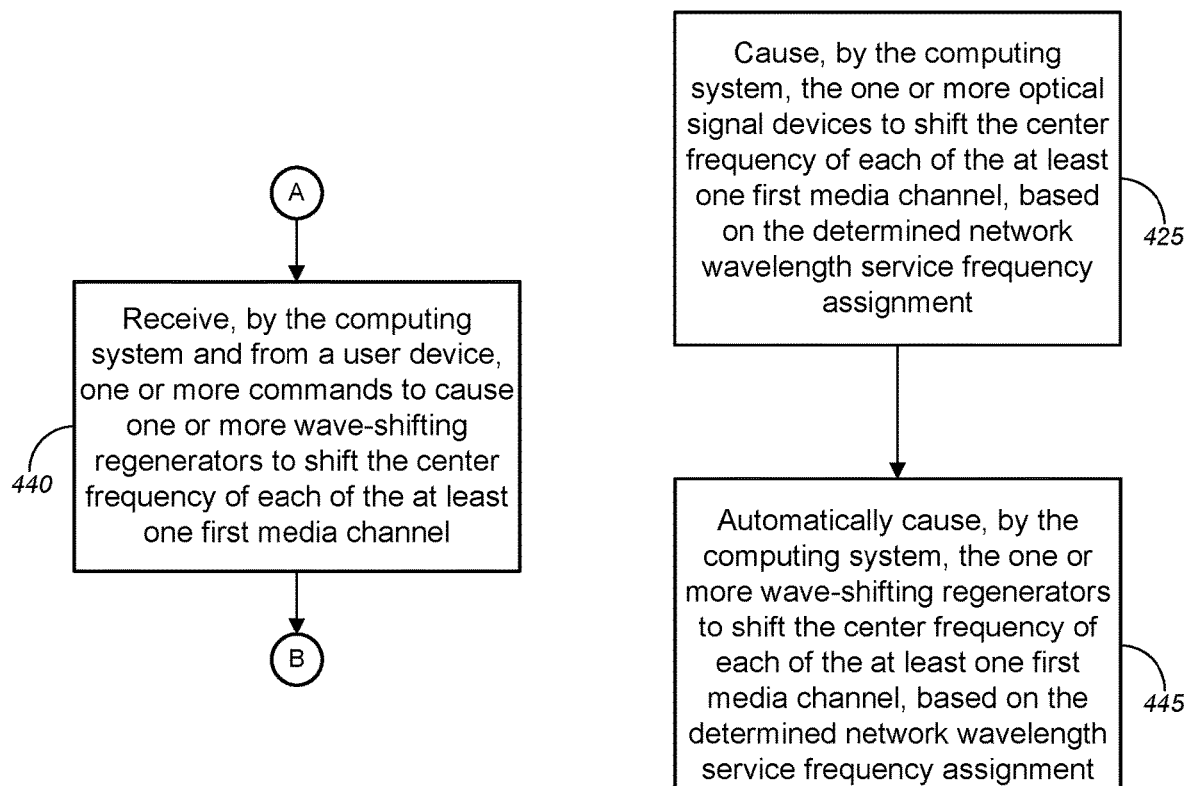
Fig. 4C
Fig. 4D

OPTICAL FREQUENCY SPECTRAL OPTIMIZATION IN DENSE WAVELENGTH DIVISION MULTIPLEXING (DWDM) FLEX GRID SYSTEMS

CROSS-REFERENCES TO RELATED APPLICATIONS

This application claims priority to U.S. Patent Application Ser. No. 63/479,502 (the "'502 application"), filed Jan. 11, 2023, by James E. Shearer et al., entitled, "Optical Frequency Spectral Optimization in Dense Wavelength Division Multiplexing (DWDM) Flex Grid Systems," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing frequency spectrum optimization, and, more particularly, to methods, systems, and apparatuses for implementing optical frequency spectral optimization in dense wavelength division multiplexing ("DWDM") flex grid systems.

BACKGROUND

Mainstream optical transport systems seek to maximize the use of fiber optic spectral capacity. Optical transponders use advanced signal processing (e.g., modulation scheme(s)) to increase the capacity within the same amount of spectrum. Depending on the path the optical signal travels, the modulation scheme may occupy more bandwidth or less bandwidth; longer paths require more bandwidth to maintain a certain quality of service. Further, several generations of optical transponders co-existing within the same system can cause the amount of bandwidth consumed to vary. Further, channels may be added or deleted over time. The result may be a patchwork of varying wavelength services which occupy or consume different bandwidths.

Ideally, the entire available optical spectrum is fully utilized. In practice, some parts of the spectrum are better than others for different optical paths. This may leave gaps of spectrum that reduce the utilization of the entire spectrum. Any optimization of the optical spectrum conventionally requires shutting down the system first, which would severely impact services.

It is with respect to this general technical environment to which aspects of the present disclosure are directed.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components. For denoting a plurality of components, the suffixes "a" through "n" may be used, where n denotes any suitable integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 105a-105n, the integer value of n in 105n may be the same or different from the integer value of n in 110n for component #2 110a-110n, and so on.

FIGS. 4A-4G are flow diagrams illustrating a method for implementing optical frequency spectral optimization in DWDM flex grid systems, in accordance with various embodiments.

DETAILED DESCRIPTION OF CERTAIN EMBODIMENTS

Overview

Figure 1A:
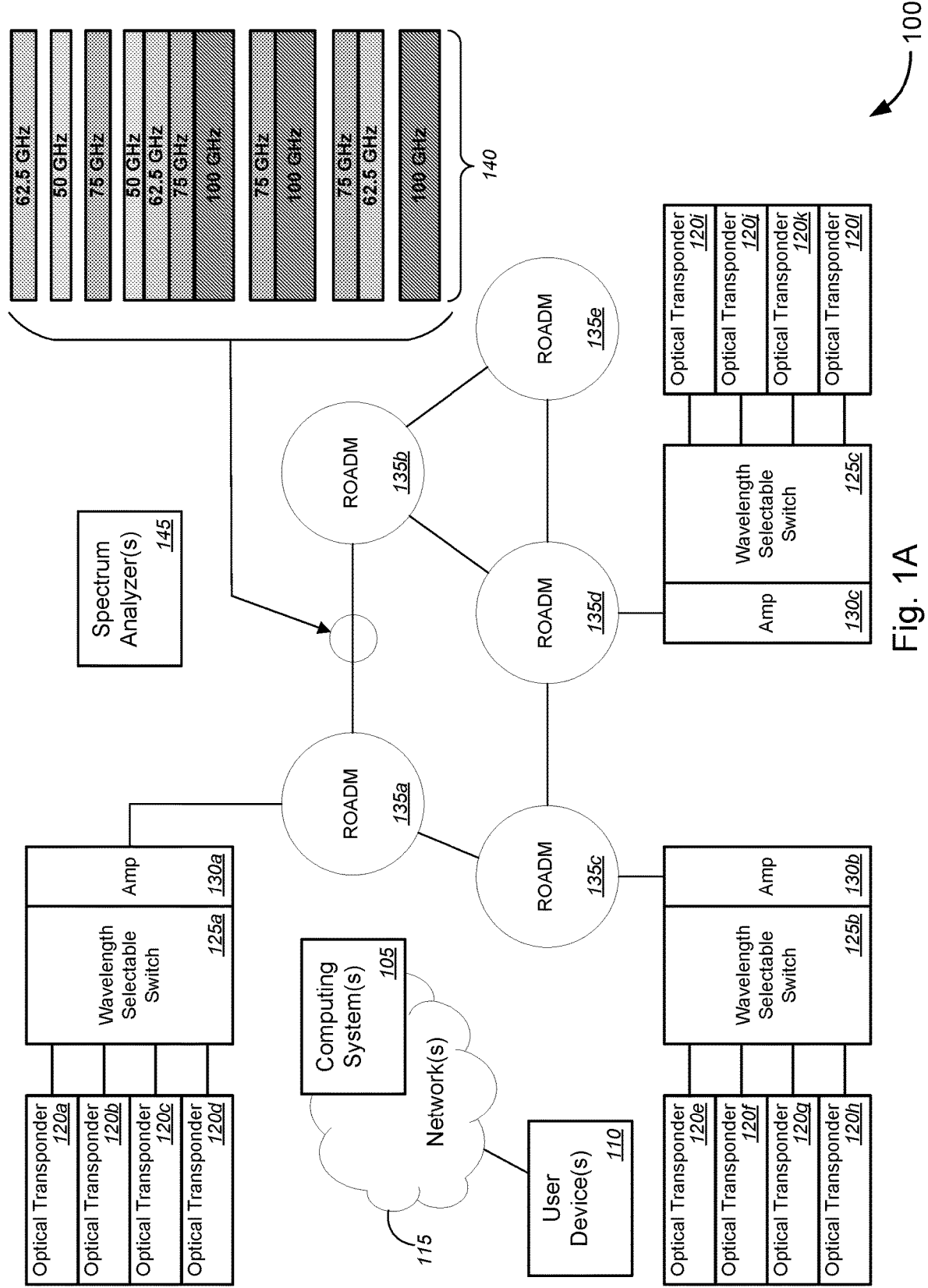
FIGS. 1A and 1B are schematic diagrams illustrating various examples of systems for implementing optical frequency spectral optimization in dense wavelength division multiplexing ("DWDM") flex grid systems, in accordance with various embodiments.

Various embodiments provide tools and techniques for implementing frequency spectrum optimization, and, more particularly, to methods, systems, and apparatuses for implementing optical frequency spectral optimization in dense wavelength division multiplexing ("DWDM") flex grid systems.

In various embodiments, based on a determination that one or more gaps of optical spectrum exist in a range of optical spectrum that contains one or more first media channels that support transmission of corresponding one or more first signals, a computing system may determine a network wavelength service frequency assignment for shifting frequency of at least one first media channel among the one or more first media channels to optimize one or more spacings among the one or more first media channels in the range of optical spectrum for supporting transmission of one or more second signals; and may cause one or more optical signal devices to shift a center frequency of each of the at least one first media channel, based on the determined network wavelength service frequency assignment, in some cases, by using at least one of: a drift process comprising causing drifting of the center frequency of each of the at least one first media channel either simultaneously or sequentially; a bridge-and-roll-by-media-channel process comprising causing bridging and rolling each of the at least one first media channel one at a time; or a bridge-and-roll-by-optical-spectrum process comprising causing bridging and rolling the one or more first media channels collectively to a new spectrum allocation; and/or the like.

By optimizing the gaps or spacings (e.g., by "defragmenting" the media channels, or the like) in the optical spectrum or network media channel, more media channels or wavelengths may be transmitted within the optimized gaps or spacings, thereby potentially utilizing all or almost all 100% of the optical spectrum, without shutting down operation thereby avoiding impacting services (and in most cases is done in a imperceptible manner from the perspective of users or customers of the network). Such optimization is particularly advantageous for spans of an optical network having limited fiber optic cables, but there is high demand to cross such sections of the network, and especially where the optical spectrum has some gaps, but none large enough to use. Hereinafter, for purposes of description, the term "gap" or "gaps" is used to refer to the unused portion of the spectrum between active media channels, while the term "spacing" or "spacings" is used to refer to the optimized portion of the spectrum through which additional media channels may be transmitted.

These and other aspects of the optical frequency spectral optimization in DWDM flex grid systems are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a method may comprise, based on a determination that one or more gaps of optical spectrum exist in a range of optical spectrum that contains one or more first media channels that support transmission of corresponding one or more first signals, determining, by a computing system, a network wavelength service frequency assignment for shifting frequency of at least one first media channel among the one or more first media channels to optimize one or more spacings among the one or more first media channels in the range of optical spectrum for supporting transmission of one or more second signals; and causing, by the computing system, one or more optical signal devices to shift a center frequency of each of the at least one first media channel, based on the determined network wavelength service frequency assignment.

In some embodiments, the computing system may comprise at least one of a control system, one or more wave-shifting regenerators, one or more fiber amplifiers, one or more optical transponders, a controller of the one or more optical transponders, one or more optical signal transceivers, a controller of the one or more optical signal transceivers, a computing system of a dense wavelength division multiplexing ("DWDM") flex grid system, a controller of the DWDM flex grid system, one or more nodes of the DWDM flex grid system, one or more reconfigurable optical add-drop multiplexers ("ROADMs"), one or more wavelength selective switches, or an element management system ("EMS"), and/or the like. In some instances, the one or more first media channels may comprise a plurality of media channels having two or more different and distinct frequency bandwidths.

According to some embodiments, the method may further comprise receiving, by the computing system and from a spectrum analyzer, one or more measurements of the one or more first media channels of the range of optical spectrum; and determining, by the computing system, whether the one or more gaps of optical spectrum exist in the range of optical spectrum based at least in part on the one or more measurements. In some cases, the method may further comprise determining, by the computing system, current utilization and wavelength service paths, by performing at least one of: gathering data associated with network topology of wavelength services each corresponding to one of the one or more media channels; identifying origination points and termination points for each wavelength service; or calculating individual route and spectral usage for each wavelength service. In some instances, determining whether the one or more gaps of optical spectrum exist in the range of optical spectrum may be further based at least in part on the determined current utilization and wavelength service paths.

In some embodiments, determining the network wavelength service frequency assignment for shifting frequency of at least one first media channel to optimize the one or more spacings in the range of optical spectrum for supporting transmission of the one or more second signals may comprise calculating, by the computing system and using an optimization algorithm, minimum changes necessary to consolidate consumed bandwidth by the one or more first media channels. In some examples, the one or more optical signal devices may comprise at least one of one or more wave-shifting regenerators, one or more fiber amplifiers, one or more optical transponders, one or more optical transceivers, one or more nodes of the DWDM flex grid system, one or more ROADMs, or one or more wavelength selective switches, and/or the like.

According to some embodiments, causing the one or more optical signal devices to shift the center frequency of each of the at least one first media channel may comprise causing, by the computing system, one or more wave-shifting regenerators to shift the center frequency of each of the at least one first media channel, based on the determined network wavelength service frequency assignment. In some instances, the method may further comprise receiving, by the computing system and from a user device, one or more commands to cause the one or more wave-shifting regenerators to shift the center frequency of each of the at least one first media channel. In some examples, causing the one or more wave-shifting regenerators to shift the center frequency of each of the at least one first media channel may be further based on the one or more commands. Alternatively, or additionally, causing the one or more wave-shifting regenerators to shift the center frequency of each of the at least one first media channel may comprise automatically causing, by the computing system, the one or more wave-shifting regenerators to shift the center frequency of each of the at least one first media channel, based on the determined network wavelength service frequency assignment.

In some embodiments, causing the one or more optical signal devices to shift the center frequency of each of the at least one first media channel comprises using a drift process may comprise causing the center frequency of each of the at least one first media channel to be gradually shifted from corresponding each of at least one first center frequency position to corresponding each of at least one second center frequency position. In some cases, the drift process may further comprise: based on a determination that the range of the optical spectrum should be expanded to cause the one or more optical signal devices to shift the center frequency of each of the at least one first media channel, performing the following: prior to shifting the center frequency of each of the at least one first media channel, causing a width of the range of optical spectrum to be increased to accommodate the at least one second center frequency position; and after shifting the center frequency of each of the at least one first media channel, causing the width of the range of optical spectrum to be decreased to its previous width. In some instances, causing the center frequency of each of the at least one first media channel to be gradually shifted may comprise one of causing simultaneous shifting the center frequency of each of the at least one first media channel or causing sequential shifting the center frequency of each of the at least one first media channel, or the like. In some cases, the one or more optical signal devices may comprise a first number of optical signal devices, the at least one first media channel may comprise a second number of media channels, and the first number of optical signal devices may match the second number of media channels. In some examples, the one or more optical signal devices may be configured to shift the center frequency of each of the at least one first media channel while maintaining transmission operation of the at least one first media channel.

Alternatively, or additionally, the one or more optical signal devices may comprise at least one first optical signal device and a second optical signal device separate from the at least one first optical signal device, and causing the one or more optical signal devices to shift the center frequency of each of the at least one first media channel may comprise using a bridge-and-roll-by-media-channel process. In some examples, bridge-and-roll-by-media-channel process may comprise: causing, by the computing system, the second optical signal device to duplicate a third media channel among the at least one first media channel that is transmitted using a third optical signal device among the at least one first optical signal device, by transmitting a fourth media channel having a center frequency position that is different from a center frequency position of the third media channel, as part of a first bridge operation among a plurality of bridge operations; causing, by the computing system, the second optical signal device to synchronize the fourth media channel with the third media channel; after synchronizing the fourth media channel with the third media channel, causing, by the computing system, the third optical signal device to stop transmitting the third media channel, as part of a first roll operation among a plurality of roll operations; causing, by the computing system, the third optical signal device to duplicate a fifth media channel among the at least one first media channel that is transmitted using a fourth optical signal device among the at least one first optical signal device, by transmitting a sixth media channel having a center frequency position that is different from a center frequency position of the fifth media channel, as part of a second bridge operation among the plurality of bridge operations; causing, by the computing system, the fourth optical signal device to synchronize the sixth media channel with the fifth media channel; after synchronizing the sixth media channel with the fifth media channel, causing, by the computing system, the fourth optical signal device to stop transmitting the fifth media channel, as part of a second roll operation among the plurality of roll operations; and repeating the second bridge operation and the second roll operation for each of the remaining media channels among the one or more first media channels. In some instances, the bridge-and-roll-by-media-channel process may further comprise: based on a determination that the range of the optical spectrum should be expanded to cause the one or more optical signal devices to shift the center frequency of each of the at least one first media channel, performing the following: prior to shifting the center frequency of each of the at least one first media channel, causing a width of the range of optical spectrum to be increased to accommodate at least the fourth media channel; and after shifting the center frequency of each of the at least one first media channel, causing the width of the range of optical spectrum to be decreased to its previous width.

Alternatively, or additionally, the one or more optical signal devices may comprise at least one fifth optical signal device and at least one sixth optical signal device separate from the at least one fifth optical signal device, and causing the one or more optical signal devices to shift the center frequency of each of the at least one first media channel may comprise using a bridge-and-roll-by-optical-spectrum process. In some examples, bridge-and-roll-by-optical-spectrum process may comprise: creating a new spectrum allocation; causing, by the computing system, the at least one sixth optical signal device to duplicate the at least one first media channel that is transmitted within an original spectrum allocation using the at least one fifth optical signal device, by transmitting at least one seventh media channel within the new spectrum allocation, as part of a collective bridge operation; causing, by the computing system, each of the at least one sixth optical signal device to synchronize corresponding each of the at least one seventh media channel with corresponding each of the at least one first media channel; after synchronizing each of the at least one seventh media channel with corresponding each of the at least one first media channel, causing, by the computing system, the at least one fifth optical signal device to stop transmitting the at least one first media channel, as part of a collective roll operation; and deleting the original spectrum. In some cases, the one or more optical signal devices may comprise a third number of optical signal devices, the at least one first media channel may comprise a fourth number of media channels, and the third number of optical signal devices may be twice the fourth number of media channels.

According to some embodiments, the one or more optical signal devices may be disposed along a segment of a path, and the one or more first media channels may be transmitted from an originating node that is located at a start of the path. In some examples, the method may further comprise: sending, by the computing system, a signal notifying the originating node of the shifting of the center frequency of each of the at least one first media channel and indicating to lock the path from other activity to prevent conflicting consumption of services.

In some embodiments, the method may further comprise performing at least one of: monitoring one or more first metrics of network wavelength services of the at least one first media channel as the center frequency of each of the at least one first media channel is being shifted, and based on a determination that the one or more first metrics do not change beyond a first predetermined threshold, allowing the shifting to continue, and based on a determination that the one or more first metrics change beyond the first predetermined threshold, allowing the shifting to continue based on a determination that metrics fall within predetermined threshold values after remediation or alerting a user, returning to one or more original frequencies, and stopping shifting processes based on a determination that metrics do not fall within predetermined threshold values after remediation; or monitoring one or more second metrics of network wavelength services of at least one adjacent media channel as the center frequency of each of the at least one first media channel is being shifted, and based on a determination that the one or more second metrics do not change beyond a second predetermined threshold, allowing the shifting to continue, and based on a determination that the one or more second metrics change beyond the second predetermined threshold, allowing the shifting to continue based on a determination that metrics fall within predetermined threshold values after remediation or alerting the user, returning to the one or more original frequencies, and stopping the shifting processes based on a determination that metrics do not fall within predetermined threshold values after remediation. In some instances, the one or more first metrics and the one or more second metrics may each comprise at least one of pre-forward error correction ("FEC") error rates, post-FEC error rates, or bit error rates ("BERs"), and/or the like.

In another aspect, a system may comprise one or more optical signal devices and a computing system. The computing system may comprise at least one first processor and a first non-transitory computer readable medium communicatively coupled to the at least one first processor. The first non-transitory computer readable medium may have stored thereon computer software comprising a first set of instructions that, when executed by the at least one first processor, causes the computing system to: based on a determination that one or more gaps of optical spectrum exist in a range of optical spectrum that contains one or more first media channels that support transmission of corresponding one or more first signals, determine a network wavelength service frequency assignment for shifting frequency of at least one first media channel among the one or more first media channels to optimize one or more spacings among the one or more first media channels in the range of optical spectrum for supporting transmission of one or more second signals; and cause the one or more optical signal devices to shift a center frequency of each of the at least one first media channel, based on the determined network wavelength service frequency assignment In yet another aspect, a method may comprise, based on a determination that one or more gaps of optical spectrum exist in a range of optical spectrum that contains one or more first media channels that support transmission of corresponding one or more first signals, determining, by a computing system, a network wavelength service frequency assignment for shifting frequency of at least one first media channel among the one or more first media channels to optimize one or more spacings among the one or more first media channels in the range of optical spectrum for supporting transmission of one or more second signals; and causing, by the computing system, one or more optical signal devices to shift a center frequency of each of the at least one first media channel, based on the determined network wavelength service frequency assignment, using at least one of: a drift process comprising causing drifting of the center frequency of each of the at least one first media channel either simultaneously or sequentially; a bridge-and-roll-by-media-channel process comprising causing bridging and rolling each of the at least one first media channel one at a time; or a bridge-and-roll-by-optical-spectrum process comprising causing bridging and rolling the one or more first media channels collectively to a new spectrum allocation; and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

SPECIFIC EXEMPLARY EMBODIMENTS

We now turn to the embodiments as illustrated by the drawings. FIGS. 1-5 illustrate some of the features of the method, system, and apparatus for implementing frequency spectrum optimization, and, more particularly, to methods, systems, and apparatuses for implementing optical frequency spectral optimization in dense wavelength division multiplexing ("DWDM") flex grid systems, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

Figure 1B:
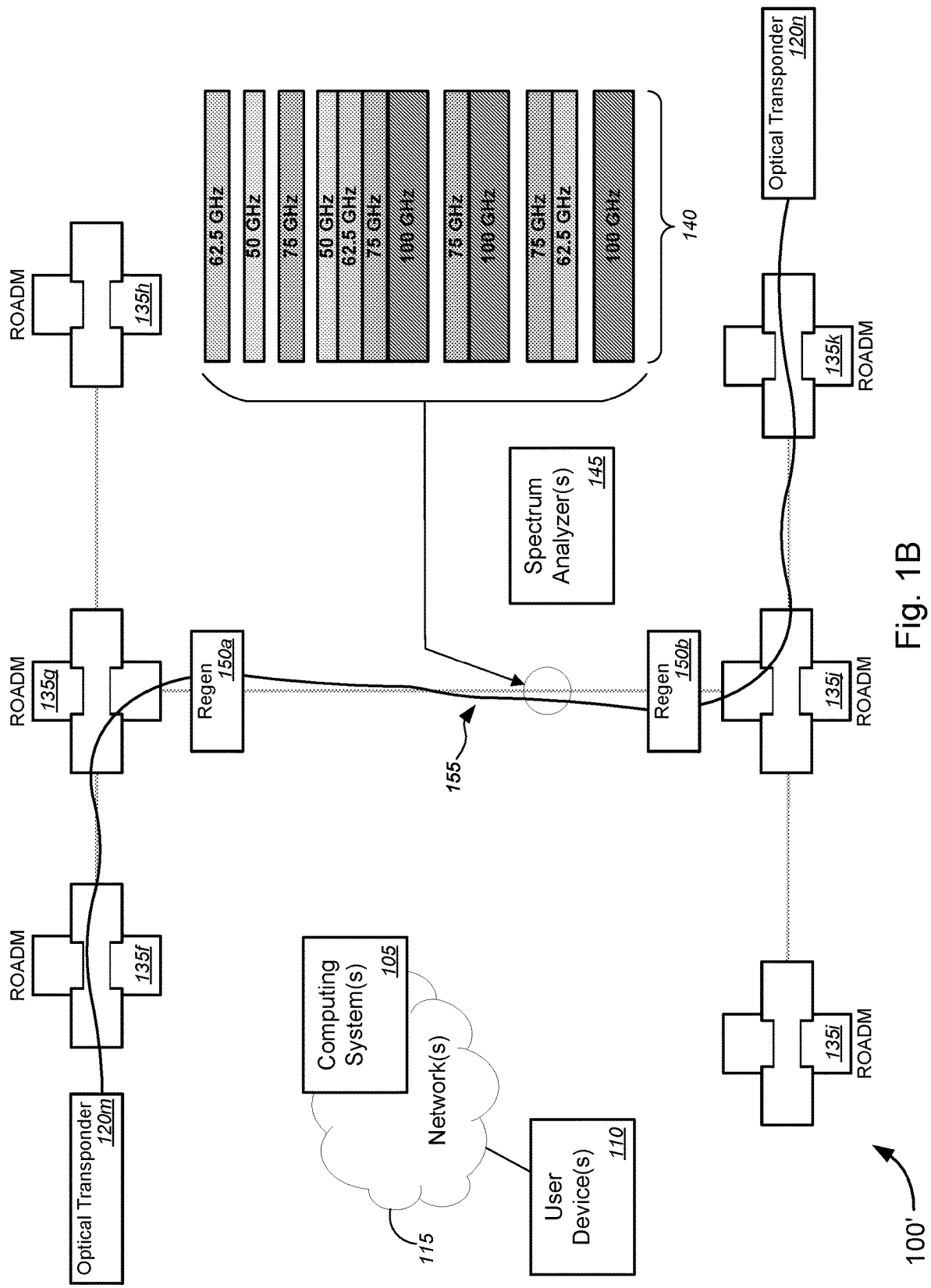

With reference to the figures, FIGS. 1A and 1B (collectively, "FIG. 1") are schematic diagrams illustrating various examples 100 and 100' of systems for implementing optical frequency spectral optimization in DWDM flex grid systems, in accordance with various embodiments.

In the non-limiting embodiment of FIG. 1A, system 100 may include, without limitation, at least one of computing system(s) 105, user device(s) 110, and network(s) 115. System 100 may further include, but is not limited to, at least one of one or more optical transponders 120a-120l (collectively, "optical transponders 120" or "transponders 120" or the like), one or more wavelength selectable switches 125a-125c (collectively, "wavelength selectable switchable switches 125" or the like), one or more amplifiers 130a-130c (collectively, "amplifiers 130" or "amps 130" or the like), one or more reconfigurable optical add-drop multiplexers ("ROADMs") 135a-135e (collectively, "ROADMs 135" or the like), and/or spectrum analyzer(s) 145, and/or the like. In some instances, although not shown in FIG. 1A, the spectrum analyzer(s) 145 may be communicatively coupled to one or more components (including, but not limited to, one or more of at least one optical transponder 120, at least one wavelength selectable switchable switch 125, at least one amp 130, or at least one ROADM 135, or the like), an input of at least one such component, an output of at least one such component, or a path between two such components, and/or the like, to obtain the spectrum data or other information necessary for performing spectrum analysis.

Similarly, in the non-limiting example of FIG. 1B, system 100' may include, without limitation, at least one of computing system(s) 105, user device(s) 110, and network(s) 115. System 100' may further include, but is not limited to, at least one of one or more optical transponders 120m and 120n (collectively, "optical transponders 120'" or "transponders 120'" or the like), one or more ROADMs 135f-135k (collectively, "ROADMs 135'" or the like), spectrum analyzer(s) 145, and/or one or more wave-shifting regenerators 150a and 150b (collectively, "regenerators 150" or "regens 150" or the like), and/or the like. In some instances, although not shown in FIG. 1B, the spectrum analyzer(s) 145 may be communicatively coupled to one or more components (including, but not limited to, one or more of at least one optical transponder 120, at least one ROADM 135, or at least one regenerator 150, or the like), an input of at least one such component, an output of at least one such component, or a path between two such components, and/or the like, to obtain the spectrum data or other information necessary for performing spectrum analysis. Although one wavelength (denoted by curved line 155, or the like) is depicted in FIG. 1B traversing a network, there may be many such wavelengths present across the line systems (not shown for simplicity of illustration). The span between regen 150a and regen 150b may have limited fiber optic cables, but there may be high demand to cross this section of the network. The optical spectrum 140 has some gaps, but none large enough to use. If these gaps can be consolidated (or "defragmented"), then more wavelengths could be provisioned across this span. Here, the regens 150 may have the capability to shift frequencies or to change the center wavelength or center frequency of a media channel between its input and its output. The span between two regenerators 150 may be configured to perform optimization, either by manual request or by periodic (or event-triggered) automation, or the like. FIG. 2B depicts a non-limiting example of such optimization.

In some embodiments, the computing system(s) 105 may include, without limitation, at least one of a control system, one or more wave-shifting regenerators (e.g., regens 150, or the like), one or more fiber amplifiers (e.g., amps 130, or the like), one or more optical transponders (e.g., transponders 120 or 120', or the like), a controller of the one or more optical transponders, one or more optical signal transceivers, a controller of the one or more optical signal transceivers, a computing system of a DWDM flex grid system, a controller of the DWDM flex grid system, one or more nodes of the DWDM flex grid system, one or more ROADMs (e.g., ROADMs 135 or 135', or the like), one or more wavelength selective or selectable switches (e.g., wavelength selectable switches 125, or the like), or an element management system ("EMS"), and/or the like. Herein, a "ROADM" may refer to a form of optical add-drop multiplexer that is capable of remotely switching traffic from a wavelength-division multiplexing ("WDM") system at the wavelength layer, e.g., through the use of a wavelength selective or selectable switching module, or the like. This allows individual or multiple wavelengths carrying data channels to be added and/or dropped from a transport fiber without the need to convert the signals on all of the WDM channels to electronic signals and back again to optical signals. Herein, "WDM" may refer to a technology that multiplexes a number of optical carrier signals onto a single optical fiber by using different wavelengths (i.e., colors) of laser light. Herein, a "transponder" may refer to a device that sends and receives optical signals from a fiber, and is typically characterized by its data rate and the maximum distance the signal can travel. A transponder and a transceiver may comprise functionally similar devices that convert a full-duplex electrical signal in a full-duplex optical signal. In examples, a difference between the two is that transceivers interface electrically with the host system using a serial interface, whereas transponders use a parallel interface to do so.

In some instances, the user device(s) 110 may each include, but is limited to, one of a desktop computer, a laptop computer, a tablet computer, a smart phone, a mobile phone, a network operations center ("NOC") computing system or console, or any suitable device capable of communicating with network(s) 115 or with servers or other network devices within network(s) 115, or via any suitable device capable of communicating with at least one of the computing system(s) 105, the one or more transponders 120 or 120', the one or more wavelength selectable switches 125, the one or more amps 130, the one or more ROADMs 135 or 135', the spectrum analyzer(s) 145, and/or the one or more regenerators 150, and/or the like, via a web-based portal, an application programming interface ("API"), a server, a software application ("app"), or any other suitable communications interface, or the like (not shown), over network(s) 115.

According to some embodiments, network(s) 115 may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 115 may include an access network of the service provider (e.g., an Internet service provider ("ISP")). In another embodiment, the network(s) 115 may include a core network of the service provider and/or the Internet.

In operation, based on a determination that one or more gaps (e.g., gaps 260a-260f, as shown, e.g., in FIG. 2A, or the like) of optical spectrum exist in a range of optical spectrum (e.g., optical spectrum 240b of FIGS. 2A and 2B, or the like) that contains one or more first media channels that support transmission of corresponding one or more first signals, at least one of computing system(s) 105, one or more transponders 120 or 120', one or more wavelength selectable switches 125, one or more amps 130, one or more ROADMs 135 or 135', and/or one or more regenerators 150, and/or the like (collectively, "computing system" or the like) may determine a network wavelength service frequency assignment for shifting frequency of at least one first media channel among the one or more first media channels to optimize one or more spacings (e.g., spacings 265a and 265b, as shown, e.g., in FIG. 2B, or the like) among the one or more first media channels in the range of optical spectrum (e.g., optical spectrum 240*d* of FIG. 2B, or the like) for supporting transmission of one or more second signals; and may cause one or more optical signal devices to shift a center frequency of each of the at least one first media channel, based on the determined network wavelength service frequency assignment. In some instances, the one or more first media channels may comprise a plurality of media channels having two or more different and distinct frequency bandwidths (as shown, e.g., in FIGS. 1A, 1, and 2A-2C, or the like, in which media channels with 50 GHz bandwidth are intermixed within the optical spectrum with media channels with 62.5 GHz bandwidth, with media channels with 75 GHz bandwidth, and/or with media channels with 100 GHz bandwidth, and/or the like). Although the various embodiments depict particular optical spectra with particular arrangement(s) or assignment(s) of media channels, and although the media channels have particular bandwidths (e.g., 50 GHz, 62.5 GHz, 75 GHz, and 100 GHz, or the like), these are merely for purposes of illustration. The various embodiments are not so limited, and the optical spectra may have any particular assignment of frequencies and may include media channels having any suitable bandwidths not limited to the ones depicted or described herein.

According to some embodiments, the computing system may receive, from a spectrum analyzer (e.g., spectrum analyzer(s) 145, or the like), one or more measurements of the one or more first media channels of the range of optical spectrum; and may determine whether the one or more gaps of optical spectrum exist in the range of optical spectrum based at least in part on the one or more measurements. In some cases, the computing system may determine current utilization and wavelength service paths, e.g., by performing at least one of: gathering data associated with network topology of wavelength services each corresponding to one of the one or more media channels; identifying origination points and termination points for each wavelength service; or calculating individual route and spectral usage for each wavelength service. In some instances, determining whether the one or more gaps of optical spectrum exist in the range of optical spectrum may be further based at least in part on the determined current utilization and wavelength service paths.

In some embodiments, determining the network wavelength service frequency assignment for shifting frequency of at least one first media channel to optimize the one or more spacings in the range of optical spectrum for supporting transmission of the one or more second signals may comprise the computing system calculating, using an optimization algorithm, minimum changes necessary to consolidate consumed bandwidth by the one or more first media channels. In some examples, the one or more optical signal devices may include, without limitation, at least one of one or more wave-shifting regenerators (e.g., regens 150, or the like), one or more fiber amplifiers (e.g., amps 130, or the like), one or more optical transponders (e.g., transponders 120 or 120', or the like), one or more optical transceivers, one or more nodes of the DWDM flex grid system, one or more ROADMs (e.g., ROADMs 135 or 135', or the like), or one or more wavelength selective switches (e.g., wavelength selectable switches 125, or the like), and/or the like.

According to some embodiments, causing the one or more optical signal devices to shift the center frequency of each of the at least one first media channel may comprise the computing system causing one or more wave-shifting regenerators (e.g., regenerators 150, or the like) to shift the center frequency of each of the at least one first media channel, based on the determined network wavelength service frequency assignment. In some instances, the computing system may receive, from a user device (e.g., user device(s) 110, or the like), one or more commands to cause the one or more wave-shifting regenerators to shift the center frequency of each of the at least one first media channel. In some examples, causing the one or more wave-shifting regenerators to shift the center frequency of each of the at least one first media channel may be further based on the one or more commands. Alternatively, or additionally, causing the one or more wave-shifting regenerators to shift the center frequency of each of the at least one first media channel may comprise the computing system automatically causing the one or more wave-shifting regenerators to shift the center frequency of each of the at least one first media channel, based on the determined network wavelength service frequency assignment.

In some embodiments, the system 100 or 100' may further perform at least one of: monitoring (e.g., using the spectrum analyzer(s) 145 and/or other sensors (not shown), or the like) one or more first metrics of network wavelength services of the at least one first media channel as the center frequency of each of the at least one first media channel is being shifted, and based on a determination that the one or more first metrics do not change beyond a first predetermined threshold (e.g., 1, 2, 3, 4, 5, 6, 7, 8, 9, 10, 11, 12, 13, 14, 15, 16, 17, 18, 19, or 20% change, or the like, or a threshold number within a range between 1 and 20, between 1 and 5, between 1 and 10, or between 1 and 15, or the like), allowing the shifting to continue, and based on a determination that the one or more first metrics change beyond the first predetermined threshold, allowing the shifting to continue based on a determination that metrics fall within predetermined threshold values after remediation or alerting the user, returning to the original frequency, and stopping the process based on a determination that metrics do not fall within predetermined threshold values after remediation; or monitoring (e.g., using the spectrum analyzer(s) 145 and/or other sensors (not shown), or the like) one or more second metrics of network wavelength services of at least one adjacent media channel as the center frequency of each of the at least one first media channel is being shifted, and based on a determination that the one or more second metrics do not change beyond a second predetermined threshold (e.g., 1, 2, 3, 4, 5, 6, 7, 8, 9, 10, 11, 12, 13, 14, 15, 16, 17, 18, 19, or 20% change, or the like, or a threshold number within a range between 1 and 20, between 1 and 5, between 1 and 10, or between 1 and 15, or the like), allowing the shifting to continue, and based on a determination that the one or more second metrics change beyond the second predetermined threshold, allowing the shifting to continue based on a determination that metrics fall within predetermined threshold values after remediation or alerting the user, returning to the original frequency, and stopping the process based on a determination that metrics do not fall within predetermined threshold values after remediation. In some instances, the one or more first metrics and the one or more second metrics may each include, but are not limited to, at least one of pre-forward error correction ("FEC") error rates, post-FEC error rates, or bit error rates ("BERs"), and/or the like.

In an aspect, based on a determination that one or more gaps of optical spectrum exist in a range of optical spectrum that contains one or more first media channels that support transmission of corresponding one or more first signals, the computing system may determine a network wavelength service frequency assignment for shifting frequency of at least one first media channel among the one or more first media channels to optimize one or more spacings among the one or more first media channels in the range of optical spectrum for supporting transmission of one or more second signals; and may cause one or more optical signal devices to shift a center frequency of each of the at least one first media channel, based on the determined network wavelength service frequency assignment, using at least one of: a drift process comprising causing drifting of the center frequency of each of the at least one first media channel either simultaneously or sequentially; a bridge-and-roll-by-media-channel process comprising causing bridging and rolling each of the at least one first media channel one at a time; or a bridge-and-roll-by-optical-spectrum process comprising causing bridging and rolling the one or more first media channels collectively to a new spectrum allocation; and/or the like.

Referring to FIG. 1A or 1B, a span that is designed to optimize spectrum will have a minimum available spectrum threshold. For instance, if 100 GHz is configured as the threshold, no optimizations will be attempted until there are no gaps with 100 GHz available. In some examples, the optimization algorithm may calculate the minimum changes necessary to consolidate consumed bandwidth. It is not the goal to have all open spectrum contiguous, but to maintain the 'minimum available spectrum threshold.' When a service is built as a Sub-Network Connection ("SNC") Layer 0 control plane, the originating node should be notified that an optimization is in progress. While a spectrum optimization is in-progress, the existing and future spectrum should be blocked, preventing conflicting consumption of a new service. When there is insufficient spectrum available to attain the minimum spectrum, the node should register this as a condition of the line port.

These and other functions of the system 100 (and its components) are described in greater detail below with respect to FIGS. 2-4.

Figure 2A:
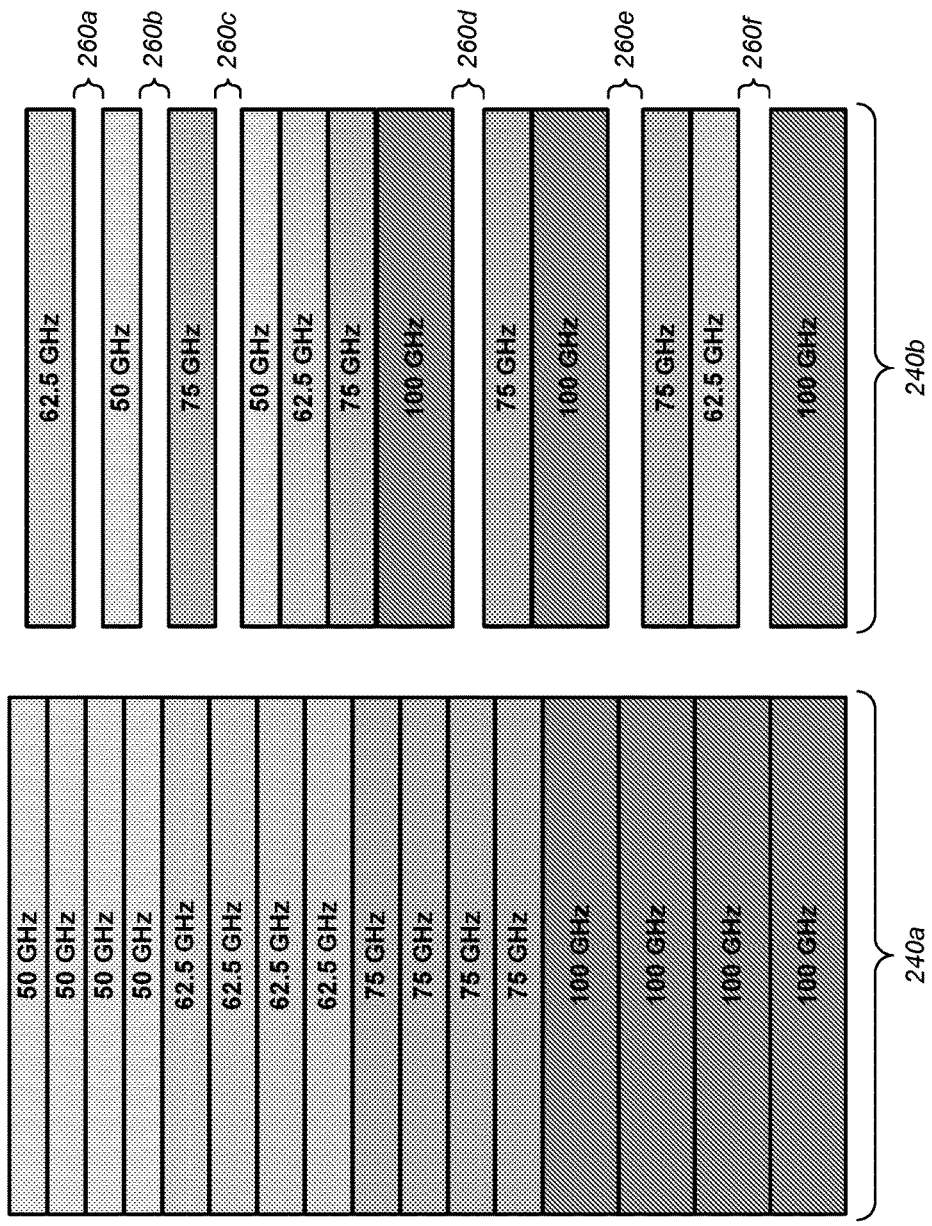
FIG. 2A is a schematic diagram illustrating a non-limiting example of an optical frequency spectrum in practice compared with an ideal optical frequency spectrum, in accordance with various embodiments.
Figure 2B:
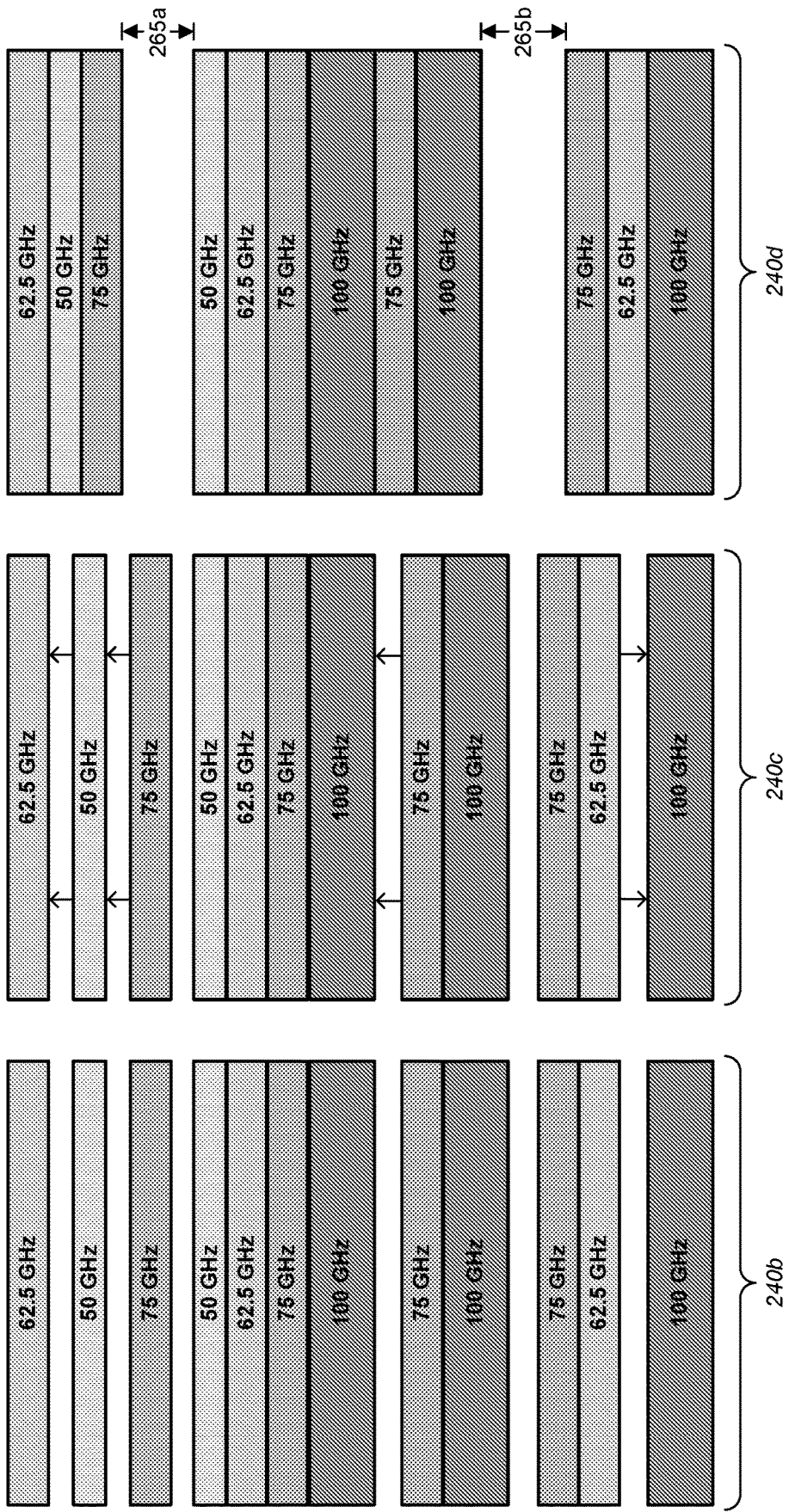
FIG. 2B is a schematic diagram illustrating a non-limiting example of optical frequency spectral optimization from the optical frequency spectrum in practice as shown in FIG. 2A to an optimized optical frequency spectrum, in accordance with various embodiments.

FIGS. 2A and 2B (collectively, "FIG. 2") illustrate non-limiting examples 200 of optical frequency spectrum that may be found in DWDM flex grid systems. FIG. 2A is a schematic diagram illustrating a non-limiting example 200 of an optical frequency spectrum in practice compared with an ideal optical frequency spectrum, in accordance with various embodiments. FIG. 2B is a schematic diagram illustrating a non-limiting example 200 of optical frequency spectral optimization from the optical frequency spectrum in practice as shown in FIG. 2A to an optimized optical frequency spectrum, in accordance with various embodiments.

Ideally, the entire available optical spectrum (e.g., spectrum 240a, or the like) is fully utilized, as shown, e.g., in FIG. 2A. Practically (or in reality), however, some parts of the spectrum are better than others for different optical paths, which may leave gaps (e.g., gaps 260a-260f as shown, e.g., in FIG. 2A) that reduces the utilization of the spectrum. In some cases, the gaps may not be wide enough for the smallest bandwidth media channel that is used for that spectrum.

To solve this issue, in some embodiments, current utilization and wavelength service paths may be evaluated, and, at the planning stage, information may be gathered as follows: network topology of wavelength service may be gathered (including, but not limited to, regenerated wavelength services as locations to break up segments of the overall wavelength services, or the like); information may be gathered regarding multiple origination and termination points; individual routes and spectral usage may be calculated; and/or network wavelength service frequency assignment(s) may be assessed and planned; and/or the like.

According to some embodiments, the wavelength services may be shifted without disrupting services. In some instances, the system may coordinate optical transponders' transmitted frequency(ies) using network calls (including, but not limited to, Layer 0 control plane signal network calls, or the like). In some examples, the signaled path may use a hierarchy in which the originating node may be considered (or denoted) as the "owner" of the path, in some cases, with segments between tuning points having subordinate control to shift (e.g., to drift, to bridge and roll, or to otherwise migrate, etc.) the spectrum, or the like. In some instances, when a subordinate elects to shift or migrate a wave, it may signal to the originating "owner" of the path or activity, in response to which the path "owner" may lock the path from other activity(ies) to avoid or minimize service conflicts. In some cases, potential contention may be managed as the wavelength services are caused to shift or migrate. In some examples, multiple subordinate segments may be managed and/or coordinated to cause shifting of wavelength services at the same time (i.e., simultaneously or concurrently) if multiple drifting, shifting, and/or migrating segments are capable of maintaining signal integrity. In some instances, pre-FEC error rate and/or other metrics may be monitored as the frequency is caused to be shifted or migrated, and shifting or migration may be allowed to continue if the metrics do not change significantly (e.g., beyond the first predetermined threshold, as described above, or the like). Alternatively, or additionally, adjacent wavelength service metrics may also be monitored to confirm that shifting or migrating some segments does not disrupt or degrade other services (for example, does not change significantly, e.g., beyond the second predetermined threshold, as described above, or the like). The process may be repeated recursively for each wavelength service until spectral usage is optimized or becomes optimum (e.g., until there is minimal gaps or empty space between most optical services within the spectrum, or the like).

FIG. 2B depicts a non-limiting example of optical frequency spectral optimization, in which the starting point optical spectrum 240b is optimized or caused to shift center frequencies of at least one media channel to arrive at an optimized end point optical spectrum 240d, e.g., by optimizing the gap(s) 260 or spacing(s) 265 (including, but not limited to, to shifting or migrating the center frequencies of one or more media channels (as denoted in FIG. 2B by arrows across gaps 260 between selected adjacent yet spaced-apart media channels of optical spectrum 240c), thereby allowing the optimized end point optical spectrum 240d to support two or more additional wavelengths (or media channels), to potentially utilize all 100% of the optical spectrum 240. Examples of some techniques for performing the shifting or optimization are described below with respect to FIGS. 3A-3C.

These and other functions of the examples 200 are described in greater detail herein with respect to FIGS. 1, 3, and 4.

Figure 3A:
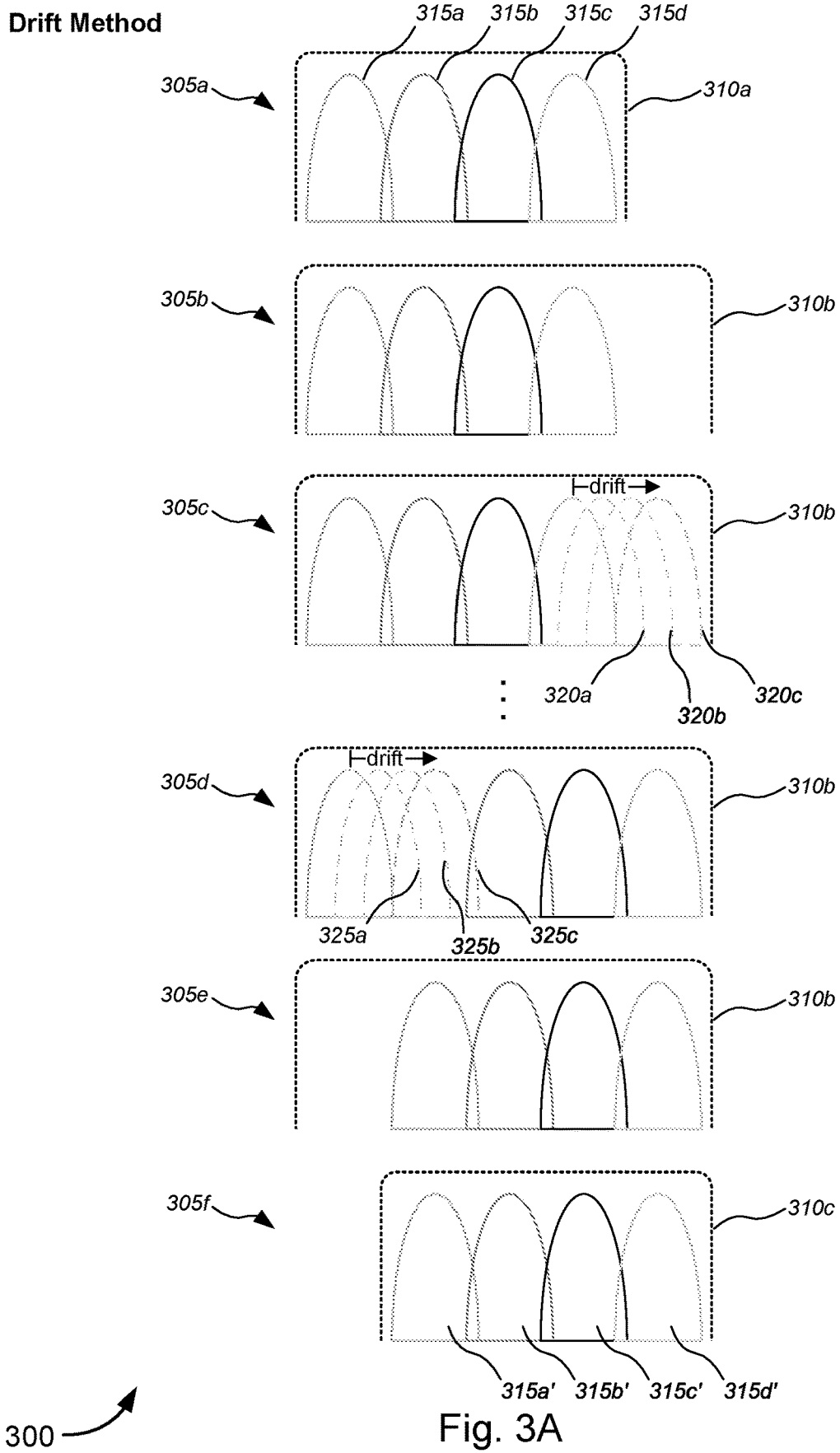
FIGS. 3A-3C are schematic diagrams illustrating various non-limiting examples of techniques for implementing optical frequency spectral optimization in DWDM flex grid systems, in accordance with various embodiments.
Figure 3B:
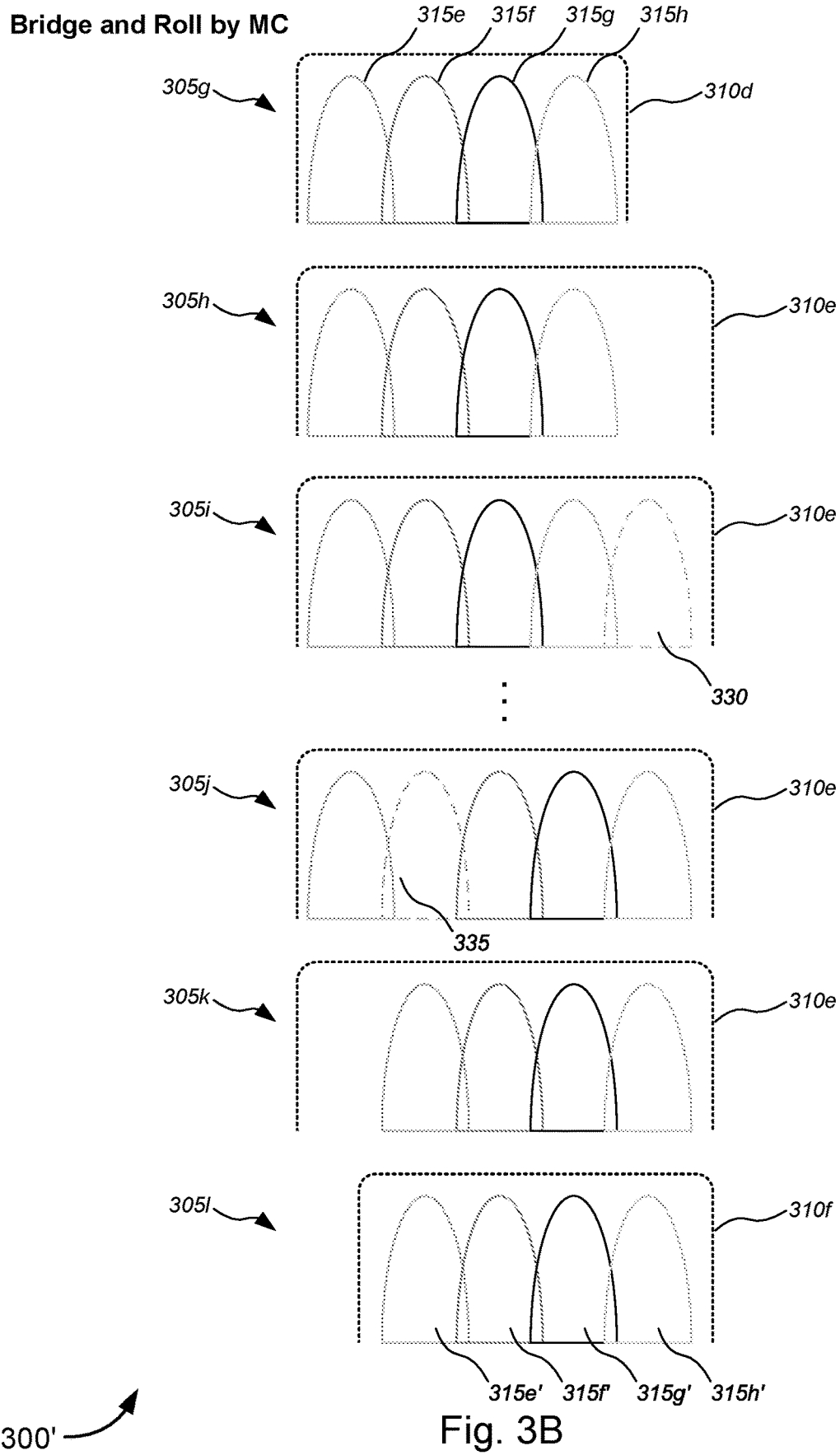
Figure 3C:
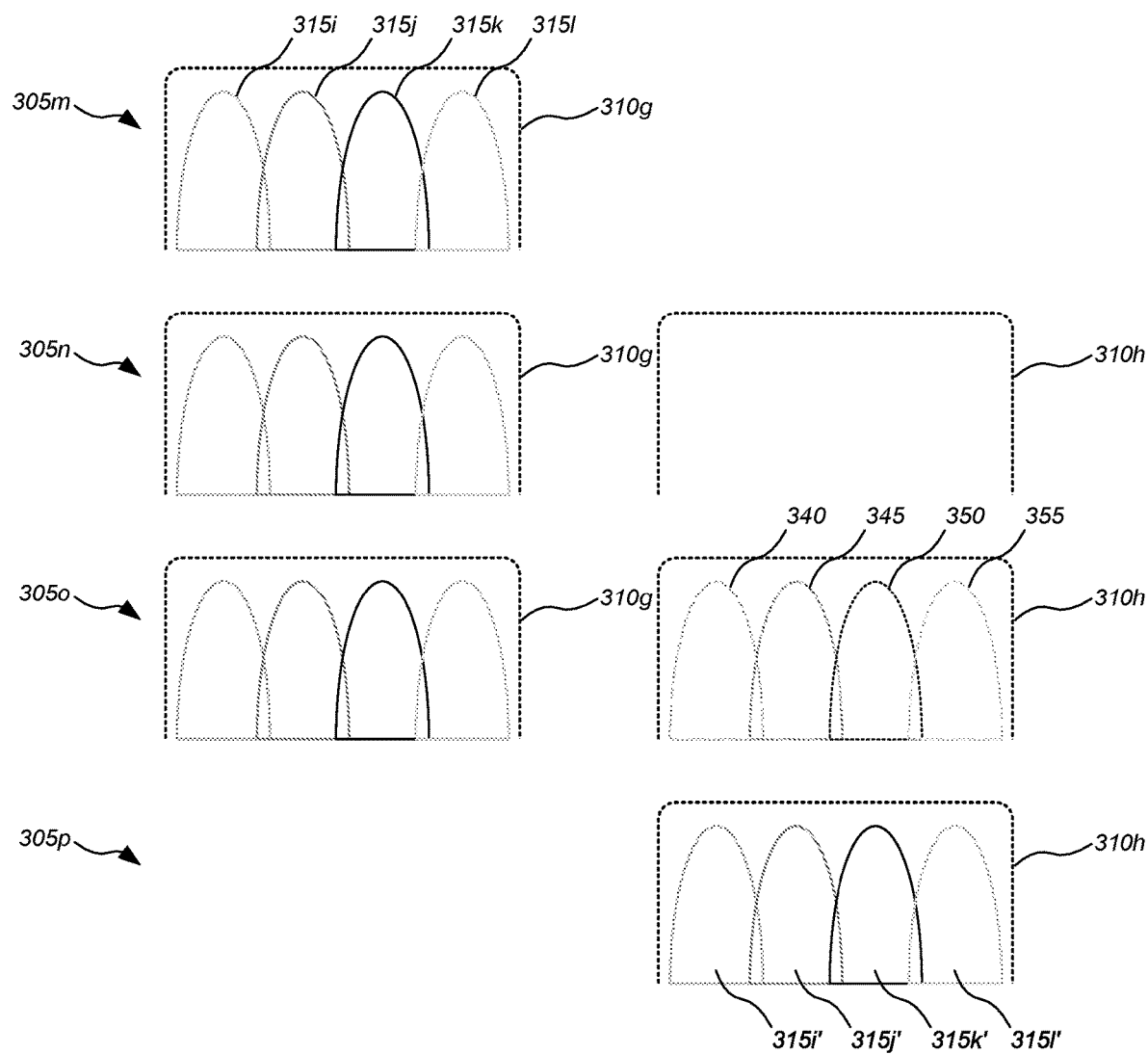

FIGS. 3A-3C (collectively, "FIG. 3") are schematic diagrams illustrating various non-limiting examples 300, 300', and 300" of techniques (including, but not limited to, the drift method 300 (as shown, e.g., in FIG. 3A), the bridge-and-roll-by-media-channel ("MC") method 300' (as shown, e.g., in FIG. 3B), the bridge-and-roll-by-network-media-channel ("NMC") or bridge-and-roll-by-optical-spectrum method 300" (as shown, e.g., in FIG. 3C), etc.) for implementing optical frequency spectral optimization in DWDM flex grid systems, in accordance with various embodiments. FIGS. 3A-3C provide illustrations of the general operations for each of the techniques, and thus, for simplicity of illustration, do not reflect shifting within a spectrum such as shown, e.g., in FIG. 2. Rather, the general operations depicted in FIGS. 3A-3C may be applied to optical spectra, such as shown in FIG. 2, or the like. For instance, drifting as shown in FIG. 3A may be applied to implement the optimization as shown in FIG. 2B. Alternatively, or additionally, bridge-and-roll-by-MC may be applied to implement the optimization as shown in FIG. 2B. Alternatively, bridge-and-roll-by-NMC may be applied to jump from starting point spectrum 240b to end point spectrum 240d as shown in FIG. 2B. For purposes of simplicity of illustration, the examples of FIG. 3 will utilize four starting point media channels and four ending point media channels. In reality, such as shown, e.g., in FIG. 2, an optical spectrum 240 may contain many more media channels (although the non-limiting examples shown in FIG. 2 are also simplified for purposes of illustration).

With reference to the non-limiting example 300 of FIG. 3A, for example, at instance 305a, spectrum (or network media channel ("NMC")) 310a may contain four media channels 315a-315d (collectively, "media channels 315" or the like). If it is determined that the spectrum 310a should be expanded to cause the one or more optical signal devices to shift (or to facilitate shifting of) the center frequency of one or more of the media channels 315, then spectrum 310a may be increased in width to fit at least one additional media channel, to form spectrum 310b, as shown at instance 305b, or the like. In some examples, such as shown in FIG. 2 where shifting would occur within the original spectrum width, there would be no need to increase the width of the spectrum as shown at instances 305a-305b (and thus no need to later decrease the width of the spectrum as shown at instances 305e-305f). At instances 305c through 305d, each media channel 315 may be caused to drift, as depicted by the "drift" arrow from the center frequency of media channel 315d through those of transitional media channels 320a-320c (which are denoted by dash-lined outlines of the media channel) to that of media channel 315d', and similarly by the "drift" arrow from the center frequency of media channel 315a through those of transitional media channels 325a-325c (which are denoted by dash-lined outlines of the media channel) to that of media channel 315a', and so on for each of the other media channels 315b and 315c, or the like.

Here, drifting may be performed gradually to stay within the tolerance of the far-end receiver (e.g., transponder, ROADM, regenerator, or other optical signal device that receives the transmitted spectrum from the corresponding transmitting optical signal device, or the like) in order to prevent or avoid transmission/reception errors. Herein, "gradually" drifting may refer to at least one of slow, incremental, and/or steadily changing in implementation of the drifting from one frequency position to the next intermediate frequency position until the end point frequency of a particular or selected media channel has been reached, which may occur over a predetermined period (e.g., 5, 10, 15, 20, 25, 30, 40, 50, 100, 150, 200, 250, 300, 350, 400, 450, 500, 600, 700, 800, or 900 ms, or 1, 2, 3, 4, 5, 10, 15, 20, 25, 30, 40, or 50 s, or 2, 3, 4, 5, 10, 15, 20, 30, 40, 50, 60 minutes, or a period within a range between 5 and 1000 ms, between 5 and 500 ms, between 5 and 100 ms, between 5 and 50 ms, between 1 and 60 s, between 1 and 30 s, between 1 and 15 s, between 1 and 60 minutes, between 1 and 30 minutes, between 1 and 10 minutes, between 1 and 5 minutes, or the like), as compared with discrete (and immediate or fast) implementation of each of the duplication/replication, synchronization, and rolling processes for each bridge-and-roll operation. While the frequency of the media channel is changed, the receiving transponder monitors the performance metrics such as Pre-FEC error rate, Post FEC error rate, etc. This data is used to assure that the rate of the frequency change is not too rapid. Furthermore, this data assures that the frequency change does not impair signal integrity. If the metrics exceed performance limits, then the operation is halted and users are alerted. Alternatively, or additionally, "gradually" drifting the (center) frequency of each media channel may refer to determining a frequency shift tolerance of a receiving device, causing a first frequency shift within the frequency shift tolerance of the receiving device, and causing at least one subsequent frequency shift (each within the frequency shift tolerance of the receiving device) until the full move or shift (for a particular or selected media channel) is completed, and the like. Although FIG. 3A depicts drifting being implemented in a sequential manner, in some cases, drifting may be performed for all selected media channels simultaneously (or concurrently) as desired. At instance 305e, all of the selected media channels have been shifted or migrated to their end point locations or center frequencies, resulting in media channels 315a'-315d' (collectively, "media channels 315'" or the like). At instance 305f, the width of spectrum 310b may be reduced or decreased to the original width, to form spectrum 310c, or the like.

Referring to the non-limiting example 300' of FIG. 3B, for example, at instance 305g, spectrum (or network media channel ("NMC")) 310d may contain four media channels 315e-315f (collectively, "media channels 315" or the like). If it is determined that the spectrum 310d should be expanded to cause the one or more optical signal devices to shift (or to facilitate shifting of) the center frequency of one or more of the media channels 315, then spectrum 310d may be increased in width to fit at least one additional media channel, to form spectrum 310e, as shown at instance 305h, or the like. In some examples, such as shown in FIG. 2 where shifting would occur within the original spectrum width, there would be no need to increase the width of the spectrum as shown at instances 305g-305h (and thus no need to later decrease the width of the spectrum as shown at instances 305k-305l). Here, the bridge-and-roll-by-MC method requires transponders to have n+1 laser transmitters per media channel on each transponder. The extra laser is not in use during normal operation, but is employed during the optimization process. During the optimization process, the extra laser is used to duplicate the media channel, then bridging and rolling may be performed for the media channel, with synchronization being used between the original media channel and its duplicate to ensure or facilitate hitless roll operations. Thereafter, the original laser for transmitting the original media channel is turned off and subsequently used as the "extra" laser and the process is repeated for each of the remaining media channels. For example, at instances 305i through 305j, each media channel 315 may be caused to bridge and roll, as depicted by the dash-lined outline of media channel 330 that is a duplicate of media channel 315h' with the media channel 330 becoming media channel 315h' after bridging and rolling operations (which includes synchronization between media channel 330 (or 315h') and media channel 315h to facilitate hitless rolling operations, or the like), and similarly by the dash-lined outline of media channel 335 that is a duplicate of media channel 315e with the media channel 335 becoming media channel 315e' after bridging and rolling operations (which includes synchronization between media channel 335 (or 315e') and media channel 315e to facilitate hitless rolling operations, or the like), and so on for each of the other media channels 315*f* and 315*g*, or the like. At instance 305*k*, all of the selected media channels have been shifted or migrated to their end point locations or center frequencies using the bridging and rolling method, as described above, resulting in media channels 315*e'*-315*h'* (collectively, "media channels 315'" or the like). At instance 305*l*, the width of spectrum 310*e* may be reduced or decreased to the original width, to form spectrum 310*f*, or the like. Turning to the non-limiting example 300" of FIG. 3C, for example, at instance 305*m*, spectrum (or network media channel ("NMC")) 310*g* may contain four media channels 315*i*-315*l* (collectively, "media channels 315" or the like). Here, the bridge-and-roll-by-NMC (or bridge-and-roll-by-optical-spectrum) method requires transponders to have 2n laser transmitters per media channel on each transponder. The extra lasers are not in use during normal operation, but are employed during the optimization process. During the optimization process, the extra lasers are used to duplicate the media channels in the entire network media channel or in the entire optical spectrum, then bridging and rolling may be performed for each media channel, with synchronization being used between each original media channel and its corresponding duplicate to ensure or facilitate hitless roll operations. Thereafter, the original lasers for transmitting the original media channels for the entire original network media channel or entire optical spectrum are turned off. For example, at instances 305*n* through 305*p*: a new spectrum allocation is created, resulting in spectrum 310*h* (as shown, e.g., at instance 305*n*); the media channels 315*i*-315*l* are duplicated in the new spectrum 310*h*, resulting in duplicate media channels 340-355 in spectrum 310*h* (as shown, e.g., at instance 305*o*) that become media channels 315*i'*-315*l'* after bridging and rolling operations (which includes synchronization between each of media channels 340-355 (or 315*i'*-315*l'*) and corresponding one of media channels 315*i*-315*l* to facilitate hitless rolling operations, or the like); and the old spectrum 310*g* is subsequently shut-off or "deleted" (as shown, e.g., at instance 305*p*).

Between transmitting and receiving pairs of optical signal devices, the same number of lasers used for transmitting must be used for receiving. In other words, for the drifting method of FIG. 3A, four lasers are used for transmitting the four media channels 315 (or 315') and four photodiodes are used for receiving said four media channels 315 (or 315'). Each of these four lasers must be able to shift frequency while maintaining operation. For the bridge-and-roll-by-MC method of FIG. 3B, five lasers (or n+1 lasers, where n is the number of media channels) are used for transmitting the four media channels 315 (or 315') and five photodiodes are used for receiving said four media channels 315 (or 315'), where four lasers are primarily used at the transmitter and four photodiodes are primarily used at the receiver for normal operations, while the fifth laser (and the corresponding fifth photodiode) is used for the bridging and rolling operation. Similarly, for the bridge-and-roll-by NMC method of FIG. 3C, eight lasers (or 2n lasers, where n is the number of media channels) are used for transmitting the four media channels 315 (or 315') and eight photodiodes are used for receiving said four media channels 315 (or 315'), where for normal operation four lasers are primarily used at the transmitter and four photodiodes are primarily used at the receiver, while the fifth through eighth lasers (and corresponding fifth through eighth photodiodes) are used for the bridging and rolling operation. The above-described operation is one direction of the flow of the signals. To support the opposite direction, the same or similar operation would apply simultaneously or concurrently in the opposite direction, but on a physically separate optical path.

These and other functions of the examples 300, 300', and 300" are described in greater detail herein with respect to FIGS. 1, 2, and 4.

FIGS. 4A-4G (collectively, "FIG. 4") are flow diagrams illustrating a method 400 for implementing optical frequency spectral optimization in DWDM flex grid systems, in accordance with various embodiments. Method 400 of FIG. 4A continues onto FIG. 4C following the circular marker denoted, "A," and returns to FIG. 4A following the circular marker denoted, "B." Method 400 of FIG. 4A either continues onto FIG. 4F following the circular marker denoted, "C," and returns to FIG. 4A following the circular marker denoted, "E," and/or continues onto FIG. 4G following the circular marker denoted, "D," and returns to FIG. 4A following the circular marker denoted, "E."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 100', 200, 300, 300', and 300" of FIGS. 1A, 1B, 2, 3A, 3B, and 3C, respectively (or components thereof), such methods may also be implemented using any suitable hardware (or software) implementation. Similarly, while each of the systems, examples, or embodiments 100, 100', 200, 300, 300', and 300" of FIGS. 1A, 1B, 2, 3A, 3B, and 3C, respectively (or components thereof), can operate according to the method 400 illustrated by FIG. 4 (e.g., by executing instructions embodied on a computer readable medium), the systems, examples, or embodiments 100, 100', 200, 300, 300', and 300" of FIGS. 1A, 1B, 2, 3A, 3B, and 3C can each also operate according to other modes of operation and/or perform other suitable procedures.

In the non-limiting embodiment of FIG. 4A, method 400, at block 405, may comprise receiving, by a computing system and from a spectrum analyzer, one or more measurements of one or more first media channels of a range of optical spectrum. At block 410, method 400 may comprise determining, by the computing system, current utilization and wavelength service paths, in some cases, by performing at least one of: gathering data associated with network topology of wavelength services each corresponding to one of the one or more media channels; identifying origination points and termination points for each wavelength service; or calculating individual route and spectral usage for each wavelength service; and/or the like.

Method 400 may further comprise, at block 415, determining, by the computing system, whether one or more gaps of optical spectrum exist in the range of optical spectrum based at least in part on the one or more measurements, and, in some cases, further based at least in part on the determined current utilization and wavelength service paths. If not, method 400 may return the process at block 405. If so, method 400 may continue onto the process at block 420.

At block 420, method 400 may comprise, based on a determination that the one or more gaps of optical spectrum exist in the range of optical spectrum that contains the one or more first media channels that support transmission of corresponding one or more first signals, determining, by the computing system, a network wavelength service frequency assignment for shifting frequency of at least one first media channel among the one or more first media channels to optimize one or more spacings among the one or more first media channels in the range of optical spectrum for supporting transmission of one or more second signals.

In some examples, method 400 may continue from the process at block 420 onto the process at block 425. In other examples, method 400 may continue onto the process at block 440 in FIG. 4C following the circular marker denoted, "A," before returning to the process at block 425 in FIG. 4A, as indicated by the circular marker denoted, "B." Method 400, at block 425, may comprise causing, by the computing system, one or more optical signal devices to shift a center frequency of each of the at least one first media channel, based on the determined network wavelength service frequency assignment.

According to some embodiments, the one or more optical signal devices may be disposed along a segment of a path, and the one or more first media channels may be transmitted from an originating node that is located at a start of the path. In some examples, method 400 may further comprise sending, by the computing system, a signal notifying the originating node of the shifting of the center frequency of each of the at least one first media channel and indicating to lock the path from other activity to prevent conflicting consumption of services.

In some embodiments, the computing system may include, without limitation, at least one of a control system, one or more wave-shifting regenerators, one or more fiber amplifiers, one or more optical transponders, a controller of the one or more optical transponders, one or more optical signal transceivers, a controller of the one or more optical signal transceivers, a computing system of a dense wavelength division multiplexing ("DWDM") flex grid system, a controller of the DWDM flex grid system, one or more nodes of the DWDM flex grid system, one or more reconfigurable optical add-drop multiplexers ("ROADMs"), one or more wavelength selective switches, or an element management system ("EMS"), and/or the like. In some instances, the one or more first media channels may include, but are not limited to, a plurality of media channels having two or more different and distinct frequency bandwidths. In some examples, the one or more optical signal devices may include, without limitation, at least one of one or more wave-shifting regenerators, one or more fiber amplifiers, one or more optical transponders, one or more optical transceivers, one or more nodes of the DWDM flex grid system, one or more ROADMs, or one or more wavelength selective switches, and/or the like.

Figure 4E:
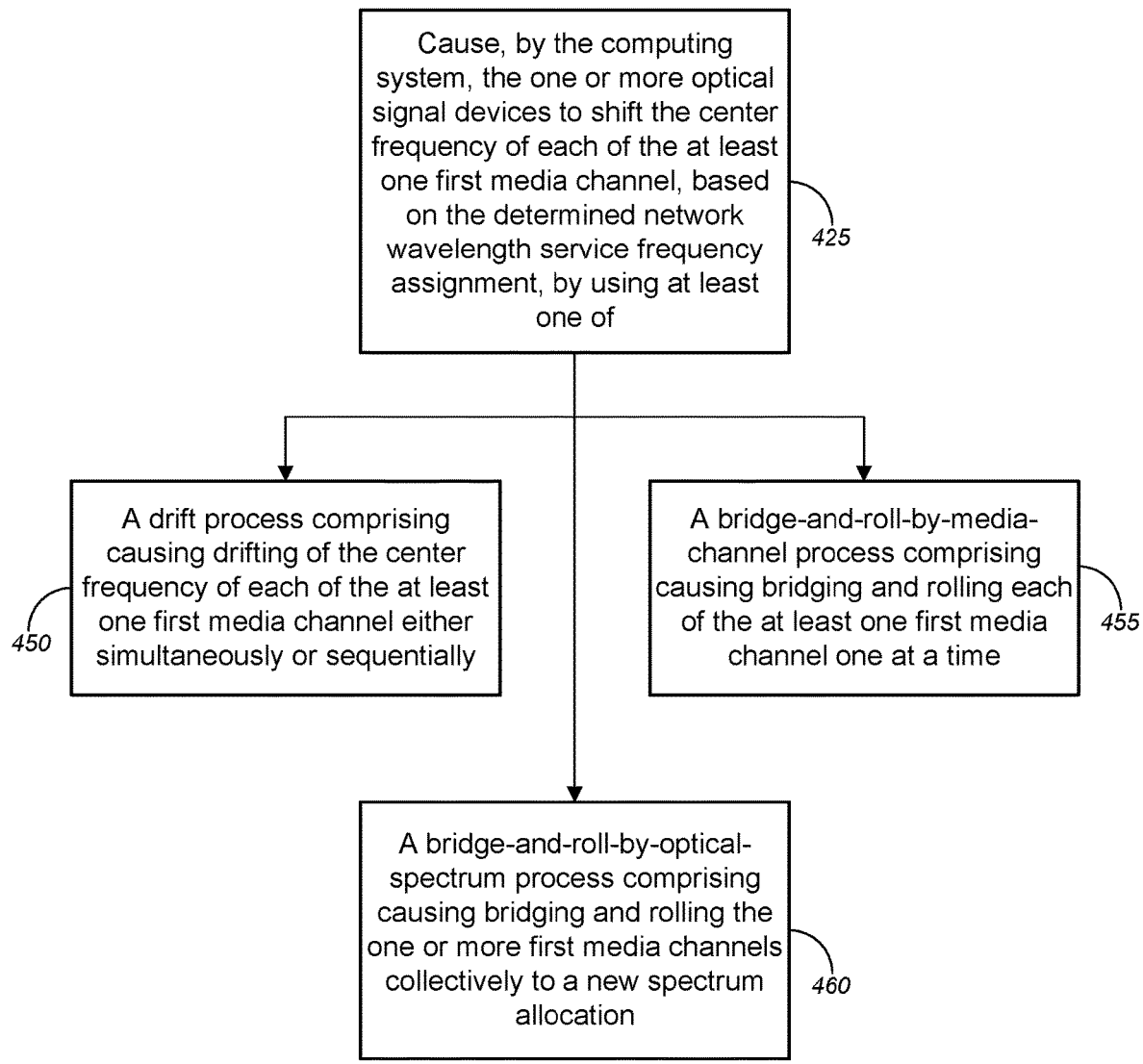
Figure 4F:
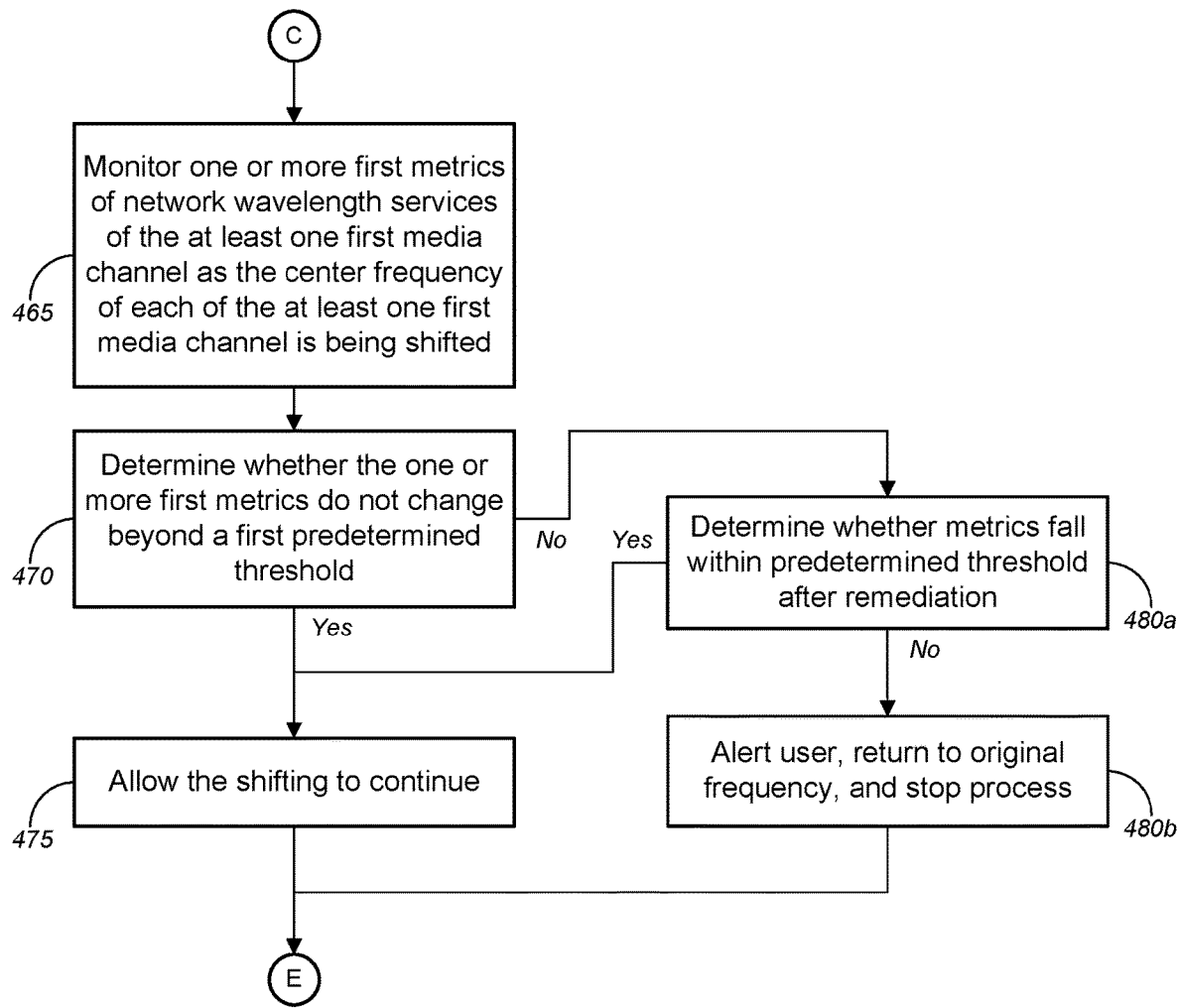
Figure 4G:
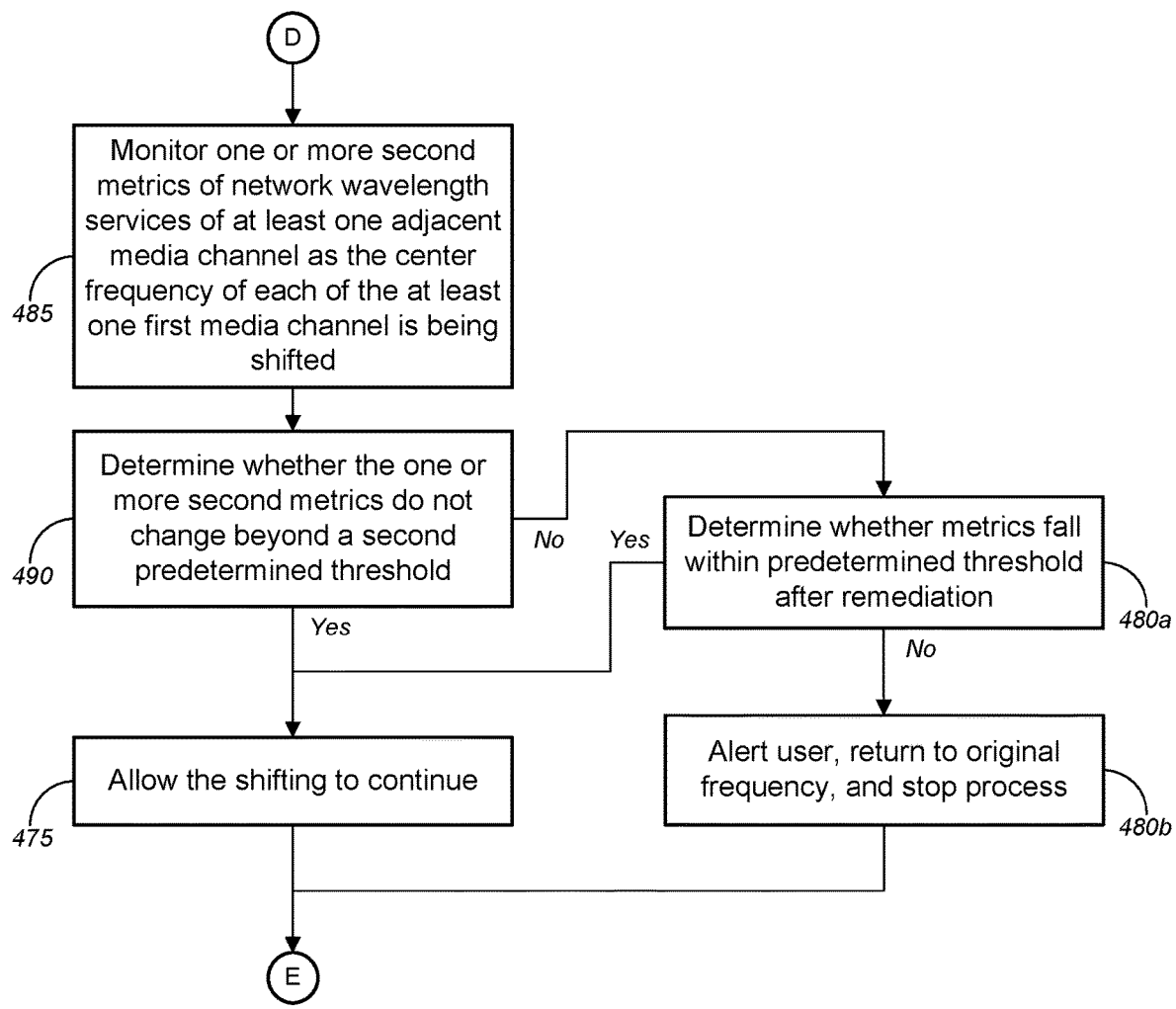

In some examples, method 400 may continue from the process at block 430 onto the process at block 465 in FIG. 4F following the circular marker denoted, "C," before returning to the process at block 405 in FIG. 4A following the circular marker denoted, "E." Alternatively, or additionally, and/or method 400 may continue from the process at block 430 onto the process at block 485 in FIG. 4G following the circular marker denoted, "D," before returning to the process at block 405 in FIG. 4A following the circular marker denoted, "E."

With reference to FIG. 4B, determining the network wavelength service frequency assignment for shifting frequency of at least one first media channel to optimize the one or more spacings in the range of optical spectrum for supporting transmission of the one or more second signals (at block 420) may comprise calculating, by the computing system and using an optimization algorithm, minimum changes necessary to consolidate consumed bandwidth by the one or more first media channels (block 435).

Referring to the non-limiting examples of FIGS. 4C and 4D, causing the one or more optical signal devices to shift the center frequency of each of the at least one first media channel (at block 425) may comprise causing, by the computing system, one or more wave-shifting regenerators to shift the center frequency of each of the at least one first media channel, based on the determined network wavelength service frequency assignment. At block 440 in FIG. 4C (following the circular marker denoted, "A," in FIG. 4A), method 400 may comprise receiving, by the computing system and from a user device, one or more commands to cause the one or more wave-shifting regenerators to shift the center frequency of each of the at least one first media channel. Method 400 may return to the process at block 425 in FIG. 4A following the circular marker denoted, "B," at which causing the one or more optical signal devices (in this case, the one or more wave-shifting regenerators, or the like) to shift the center frequency of each of the at least one first media channel may be further based on the one or more commands.

Alternatively, or additionally, with reference to FIG. 4D, causing the one or more optical signal devices (in this case, the one or more wave-shifting regenerators, or the like) to shift the center frequency of each of the at least one first media channel (at block 425) may comprise automatically causing, by the computing system, the one or more wave-shifting regenerators to shift the center frequency of each of the at least one first media channel, based on the determined network wavelength service frequency assignment (block 445).

Alternatively, or additionally, referring to the non-limiting example of FIG. 4E, causing the one or more optical signal devices to shift the center frequency of each of the at least one first media channel (at block 425) may comprise causing, by the computing system, the one or more optical signal devices to shift the center frequency of each of the at least one first media channel, by performing at least one of: a drift process comprising causing drifting of the center frequency of each of the at least one first media channel either simultaneously or sequentially (block 450); a bridge-and-roll-by-media-channel process comprising causing bridging and rolling each of the at least one first media channel one at a time (block 455); or a bridge-and-roll-by-optical-spectrum process comprising causing bridging and rolling the one or more first media channels collectively to a new spectrum allocation (block 460); and/or the like.

In some embodiments, the drift process (at block 450) may comprise causing the center frequency of each of the at least one first media channel to be gradually shifted from corresponding each of at least one first center frequency position to corresponding each of at least one second center frequency position; and, based on a determination that the range of the optical spectrum should be expanded to cause the one or more optical signal devices to shift the center frequency of each of the at least one first media channel, performing the following: prior to shifting the center frequency of each of the at least one first media channel, causing a width of the range of optical spectrum to be increased to accommodate the at least one second center frequency position; and after shifting the center frequency of each of the at least one first media channel, causing the width of the range of optical spectrum to be decreased to its previous width. In some cases, the one or more optical signal devices may comprise a first number of optical signal devices, the at least one first media channel may comprise a second number of media channels, and the first number of optical signal devices may match the second number of media channels. In some examples, the one or more optical signal devices may be configured to shift the center frequency of each of the at least one first media channel while maintaining transmission operation of the at least one first media channel.

According to some embodiments, the one or more optical signal devices may include, without limitation, at least one first optical signal device and a second optical signal device separate from the at least one first optical signal device. In some examples, bridge-and-roll-by-media-channel process (at block 455) may comprise: causing, by the computing system, the second optical signal device to duplicate a third media channel among the at least one first media channel that is transmitted using a third optical signal device among the at least one first optical signal device, by transmitting a fourth media channel having a center frequency position that is different from a center frequency position of the third media channel, as part of a first bridge operation among a plurality of bridge operations; causing, by the computing system, the second optical signal device to synchronize the fourth media channel with the third media channel; after synchronizing the fourth media channel with the third media channel, causing, by the computing system, the third optical signal device to stop transmitting the third media channel, as part of a first roll operation among a plurality of roll operations; causing, by the computing system, the third optical signal device to duplicate a fifth media channel among the at least one first media channel that is transmitted using a fourth optical signal device among the at least one first optical signal device, by transmitting a sixth media channel having a center frequency position that is different from a center frequency position of the fifth media channel, as part of a second bridge operation among the plurality of bridge operations; causing, by the computing system, the fourth optical signal device to synchronize the sixth media channel with the fifth media channel; after synchronizing the sixth media channel with the fifth media channel, causing, by the computing system, the fourth optical signal device to stop transmitting the fifth media channel, as part of a second roll operation among the plurality of roll operations; and repeating the second bridge operation and the second roll operation for each of the remaining media channels among the one or more first media channels; and/or the like. In some instances, the bridge-and-roll-by-media-channel process may further comprise: based on a determination that the range of the optical spectrum should be expanded to cause the one or more optical signal devices to shift the center frequency of each of the at least one first media channel, performing the following: prior to shifting the center frequency of each of the at least one first media channel, causing a width of the range of optical spectrum to be increased to accommodate at least the fourth media channel; and after shifting the center frequency of each of the at least one first media channel, causing the width of the range of optical spectrum to be decreased to its previous width.

In some embodiments, the one or more optical signal devices may include, but are not limited to, at least one fifth optical signal device and at least one sixth optical signal device separate from the at least one fifth optical signal device. In some examples, bridge-and-roll-by-optical-spectrum process (at block 460) may comprise: creating a new spectrum allocation; causing, by the computing system, the at least one sixth optical signal device to duplicate the at least one first media channel that is transmitted within an original spectrum allocation using the at least one fifth optical signal device, by transmitting at least one seventh media channel within the new spectrum allocation, as part of a collective bridge operation; causing, by the computing system, each of the at least one sixth optical signal device to synchronize corresponding each of the at least one seventh media channel with corresponding each of the at least one first media channel; after synchronizing each of the at least one seventh media channel with corresponding each of the at least one first media channel, causing, by the computing system, the at least one fifth optical signal device to stop transmitting the at least one first media channel, as part of a collective roll operation; and deleting the original spectrum; and/or the like. In some cases, the one or more optical signal devices may include, without limitation, a third number of optical signal devices, the at least one first media channel may include, but is not limited to, a fourth number of media channels, and the third number of optical signal devices may be (at least) twice the fourth number of media channels.

With reference to the non-limiting examples of FIGS. 4F and 4G, the shifting of the center frequency of each of the at least one first media channel and/or optimization of the optical frequency spectrum may be continued or stopped based on monitored metrics. In some instances, the one or more first metrics and the one or more second metrics may each comprise at least one of pre-forward error correction ("FEC") error rates, post-FEC error rates, or bit error rates ("BERs"), and/or the like.

For example, method 400, at block 465 in FIG. 4F (following the circular marker denoted, "C," from FIG. 4A), may comprise monitoring one or more first metrics of network wavelength services of the at least one first media channel as the center frequency of each of the at least one first media channel is being shifted. Method 400 may further comprise, at block 470, determining whether the one or more first metrics do not change beyond a first predetermined threshold (e.g., 1, 2, 3, 4, 5, 6, 7, 8, 9, 10, 11, 12, 13, 14, 15, 16, 17, 18, 19, or 20% change, or the like, or a threshold number within a range between 1 and 20, between 1 and 5, between 1 and 10, or between 1 and 15, or the like). Based on a determination that the one or more first metrics do not change beyond the first predetermined threshold, allowing the shifting to continue (block 475), and based on a determination that the one or more first metrics change beyond the first predetermined threshold, determining whether metrics fall within predetermined threshold values after remediation (block 480a). If so, method 400 may continue onto the process at block 475. If not, method 400 may continue onto the process at 480b. At block 480b, method 400 may comprise alerting the user, returning to the original frequency, and stopping the process. Method 400, after the process at block 475 or the process at block 480b, may return to the process at block 405 in FIG. 4A following the circular marker denoted, "E."

Alternatively, or additionally, method 400, at block 485 in FIG. 4G (following the circular marker denoted, "D," from FIG. 4A), may comprise monitoring one or more second metrics of network wavelength services of at least one adjacent media channel as the center frequency of each of the at least one first media channel is being shifted. Method 400 may further comprise, at block 490, determining whether the one or more second metrics do not change beyond a second predetermined threshold (e.g., 1, 2, 3, 4, 5, 6, 7, 8, 9, 10, 11, 12, 13, 14, 15, 16, 17, 18, 19, or 20% change, or the like, or a threshold number within a range between 1 and 20, between 1 and 5, between 1 and 10, or between 1 and 15, or the like). Based on a determination that the one or more second metrics do not change beyond a second predetermined threshold, allowing the shifting to continue (block 475), and based on a determination that the one or more second metrics change beyond the second predetermined threshold, determining whether metrics fall within predetermined threshold values after remediation (block 480*a*). If so, method 400 may continue onto the process at block 475. If not, method 400 may continue onto the process at block 480*b*. At block 480*b*, method 400 may comprise alerting the user, returning to the original frequency, and stopping the process. Method 400, after the process at block 475 or the process at block 480*b*, may return to the process at block 405 in FIG. 4A following the circular marker denoted, "E."

Exemplary System and Hardware Implementation

Figure 5:
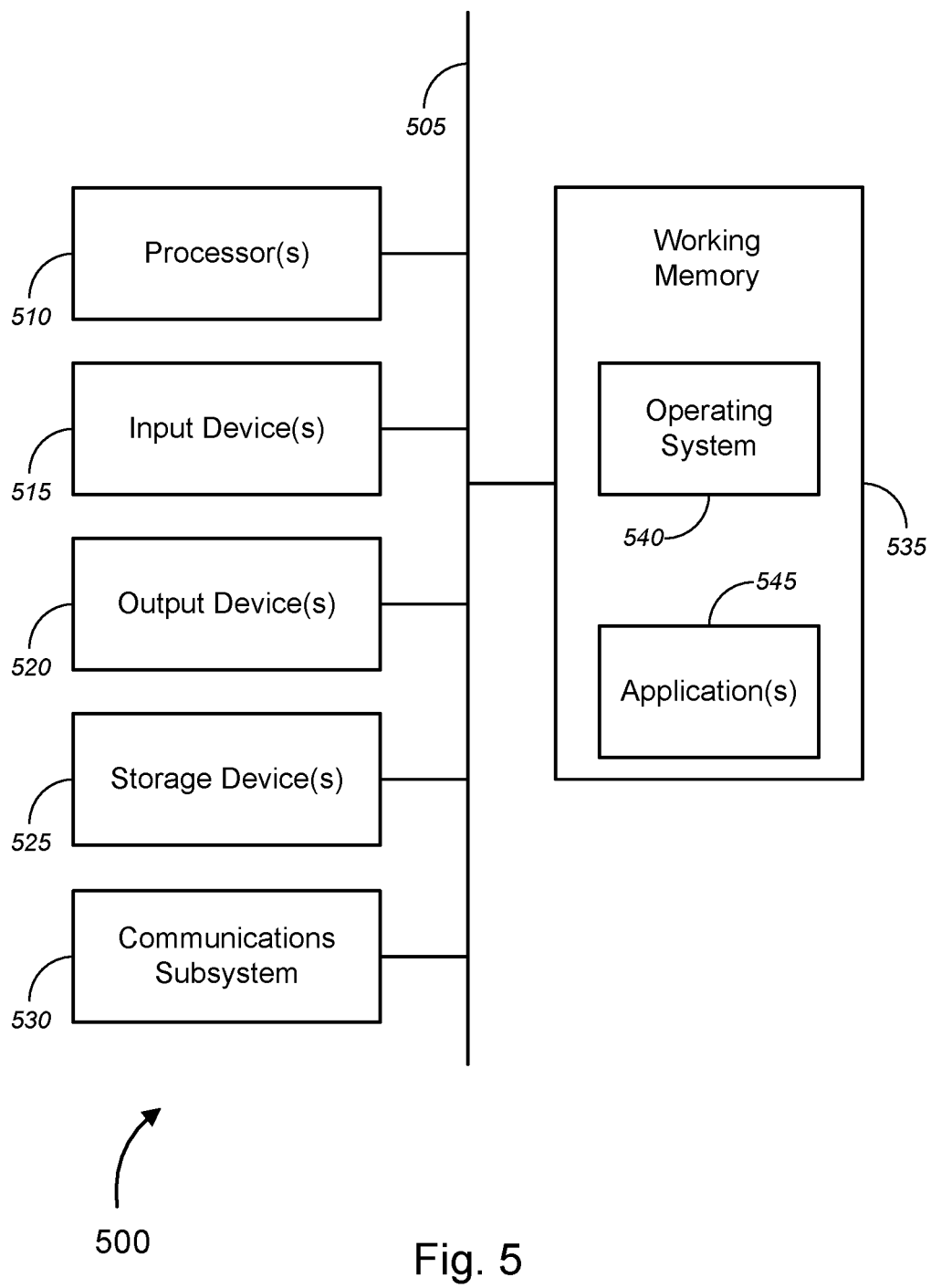
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing system(s) 105, user device(s) 110, optical transponders 120*a*-120*n*, wavelength selectable switches 125*a*-125*c*, amplifiers 130*a*-130*c*, reconfigurable optical add-drop multiplexers ("ROADMs") 135*a*-135*k*, spectrum analyzer(s) 145, and wave-shifting regenerators 150*a* and 150*b*, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing system(s) 105, user device(s) 110, optical transponders 120*a*-120*n*, wavelength selectable switches 125*a*-125*c*, amplifiers 130*a*-130*c*, ROADMs 135*a*-135*k*, spectrum analyzer(s) 145, and wave-shifting regenerators 150*a* and 150*b*, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a Wi-Fi device, a WiMAX device, a wireless wide area network ("WWAN") device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, virtual machines ("VMs"), and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   based on a determination that one or more gaps of optical spectrum exist in a range of optical spectrum that contains one or more first media channels that support transmission of corresponding one or more first signals, determining, by a computing system, a network wavelength service frequency assignment for shifting frequency of at least one first media channel among the one or more first media channels to optimize one or more spacings among the one or more first media channels in the range of optical spectrum for supporting transmission of one or more second signals;
   causing, by the computing system, one or more optical signal devices to shift a center frequency of each of the at least one first media channel, based on the determined network wavelength service frequency assignment;
   receiving, by the computing system and from a spectrum analyzer, one or more measurements of the one or more first media channels of the range of optical spectrum; and
   determining, by the computing system, whether the one or more gaps of optical spectrum exist in the range of optical spectrum based at least in part on the one or more measurements.

2. The method of claim 1, wherein the computing system comprises at least one of a control system, one or more wave-shifting regenerators, one or more fiber amplifiers, one or more optical transponders, a controller of the one or more optical transponders, one or more optical signal transceivers, a controller of the one or more optical signal transceivers, a computing system of a dense wavelength division multiplexing ("DWDM") flex grid system, a controller of the DWDM flex grid system, one or more nodes of the DWDM flex grid system, one or more reconfigurable optical add-drop multiplexers ("ROADMs"), one or more wavelength selective switches, or an element management system ("EMS").

3. The method of claim 1, wherein the one or more first media channels comprise a plurality of media channels having two or more different and distinct frequency bandwidths.

4. The method of claim 1, further comprising:
determining, by the computing system, current utilization and wavelength service paths, by performing at least one of:
gathering data associated with network topology of wavelength services each corresponding to one of the one or more media channels;
identifying origination points and termination points for each wavelength service; or
calculating individual route and spectral usage for each wavelength service;
wherein determining whether the one or more gaps of optical spectrum exist in the range of optical spectrum is further based at least in part on the determined current utilization and wavelength service paths.

5. The method of claim 1, wherein determining the network wavelength service frequency assignment for shifting frequency of at least one first media channel to optimize the one or more spacings in the range of optical spectrum for supporting transmission of the one or more second signals comprises calculating, by the computing system and using an optimization algorithm, minimum changes necessary to consolidate consumed bandwidth by the one or more first media channels.

6. The method of claim 1, wherein the one or more optical signal devices comprise at least one of one or more wave-shifting regenerators, one or more fiber amplifiers, one or more optical transponders, one or more optical transceivers, one or more nodes of the DWDM flex grid system, one or more ROADMs, or one or more wavelength selective switches.

7. The method of claim 1, wherein causing the one or more optical signal devices to shift the center frequency of each of the at least one first media channel comprises causing, by the computing system, one or more wave-shifting regenerators to shift the center frequency of each of the at least one first media channel, based on the determined network wavelength service frequency assignment.

8. The method of claim 7, further comprising:
receiving, by the computing system and from a user device, one or more commands to cause the one or more wave-shifting regenerators to shift the center frequency of each of the at least one first media channel;
wherein causing the one or more wave-shifting regenerators to shift the center frequency of each of the at least one first media channel is further based on the one or more commands.

9. The method of claim 7, wherein causing the one or more wave-shifting regenerators to shift the center frequency of each of the at least one first media channel comprises automatically causing, by the computing system, the one or more wave-shifting regenerators to shift the center frequency of each of the at least one first media channel, based on the determined network wavelength service frequency assignment.

10. The method of claim 1, wherein causing the one or more optical signal devices to shift the center frequency of each of the at least one first media channel comprises using a drift process comprising:
causing the center frequency of each of the at least one first media channel to be gradually shifted from corresponding each of at least one first center frequency position to corresponding each of at least one second center frequency position.

11. The method of claim 10, wherein the drift process further comprises:
based on a determination that the range of the optical spectrum should be expanded to cause the one or more optical signal devices to shift the center frequency of each of the at least one first media channel, performing the following:
prior to shifting the center frequency of each of the at least one first media channel, causing a width of the range of optical spectrum to be increased to accommodate the at least one second center frequency position; and
after shifting the center frequency of each of the at least one first media channel, causing the width of the range of optical spectrum to be decreased to its previous width;
wherein causing the center frequency of each of the at least one first media channel to be gradually shifted comprises one of causing simultaneous shifting the center frequency of each of the at least one first media channel or causing sequential shifting the center frequency of each of the at least one first media channel;
wherein the one or more optical signal devices comprise a first number of optical signal devices, wherein the at least one first media channel comprises a second number of media channels, wherein the first number of optical signal devices matches the second number of media channels, wherein the one or more optical signal devices are configured to shift the center frequency of each of the at least one first media channel while maintaining transmission operation of the at least one first media channel.

12. The method of claim 1, wherein the one or more optical signal devices comprises at least one first optical signal device and a second optical signal device separate from the at least one first optical signal device, wherein causing the one or more optical signal devices to shift the center frequency of each of the at least one first media channel comprises using a bridge-and-roll-by-media-channel process comprising:
causing, by the computing system, the second optical signal device to duplicate a third media channel among the at least one first media channel that is transmitted using a third optical signal device among the at least one first optical signal device, by transmitting a fourth media channel having a center frequency position that is different from a center frequency position of the third media channel, as part of a first bridge operation among a plurality of bridge operations;
causing, by the computing system, the second optical signal device to synchronize the fourth media channel with the third media channel;
after synchronizing the fourth media channel with the third media channel, causing, by the computing system, the third optical signal device to stop transmitting the third media channel, as part of a first roll operation among a plurality of roll operations;
causing, by the computing system, the third optical signal device to duplicate a fifth media channel among the at least one first media channel that is transmitted using a fourth optical signal device among the at least one first optical signal device, by transmitting a sixth media channel having a center frequency position that is different from a center frequency position of the fifth media channel, as part of a second bridge operation among the plurality of bridge operations;
causing, by the computing system, the fourth optical signal device to synchronize the sixth media channel with the fifth media channel;
after synchronizing the sixth media channel with the fifth media channel, causing, by the computing system, the fourth optical signal device to stop transmitting the fifth media channel, as part of a second roll operation among the plurality of roll operations; and
repeating the second bridge operation and the second roll operation for each of the remaining media channels among the one or more first media channels.

13. The method of claim 12, wherein the bridge-and-roll-by-media-channel process further comprises:
based on a determination that the range of the optical spectrum should be expanded to cause the one or more optical signal devices to shift the center frequency of each of the at least one first media channel, performing the following:
prior to shifting the center frequency of each of the at least one first media channel, causing a width of the range of optical spectrum to be increased to accommodate at least the fourth media channel; and
after shifting the center frequency of each of the at least one first media channel, causing the width of the range of optical spectrum to be decreased to its previous width.

14. The method of claim 1, wherein the one or more optical signal devices comprises at least one fifth optical signal device and at least one sixth optical signal device separate from the at least one fifth optical signal device, wherein causing the one or more optical signal devices to shift the center frequency of each of the at least one first media channel comprises using a bridge-and-roll-by-optical-spectrum process comprising:
creating a new spectrum allocation;
causing, by the computing system, the at least one sixth optical signal device to duplicate the at least one first media channel that is transmitted within an original spectrum allocation using the at least one fifth optical signal device, by transmitting at least one seventh media channel within the new spectrum allocation, as part of a collective bridge operation;
causing, by the computing system, each of the at least one sixth optical signal device to synchronize corresponding each of the at least one seventh media channel with corresponding each of the at least one first media channel;
after synchronizing each of the at least one seventh media channel with corresponding each of the at least one first media channel, causing, by the computing system, the at least one fifth optical signal device to stop transmitting the at least one first media channel, as part of a collective roll operation; and
deleting the original spectrum.

15. The method of claim 14, wherein the one or more optical signal devices comprise a third number of optical signal devices, wherein the at least one first media channel comprises a fourth number of media channels, wherein the third number of optical signal devices is twice the fourth number of media channels.

16. The method of claim 1, wherein the one or more optical signal devices are disposed along a segment of a path, wherein the one or more first media channels are transmitted from an originating node that is located at a start of the path, wherein the method further comprises:
sending, by the computing system, a signal notifying the originating node of the shifting of the center frequency of each of the at least one first media channel and indicating to lock the path from other activity to prevent conflicting consumption of services.

17. The method of claim 1, further comprising performing at least one of:
monitoring one or more first metrics of network wavelength services of the at least one first media channel as the center frequency of each of the at least one first media channel is being shifted, and based on a determination that the one or more first metrics do not change beyond a first predetermined threshold, allowing the shifting to continue, and based on a determination that the one or more first metrics change beyond the first predetermined threshold, allowing the shifting to continue based on a determination that metrics fall within predetermined threshold values after remediation or alerting a user, returning to one or more original frequencies, and stopping shifting processes based on a determination that metrics do not fall within predetermined threshold values after remediation; or
monitoring one or more second metrics of network wavelength services of at least one adjacent media channel as the center frequency of each of the at least one first media channel is being shifted, and based on a determination that the one or more second metrics do not change beyond a second predetermined threshold, allowing the shifting to continue, and based on a determination that the one or more second metrics change beyond the second predetermined threshold, allowing the shifting to continue based on a determination that metrics fall within predetermined threshold values after remediation or alerting the user, returning to the one or more original frequencies, and stopping the shifting processes based on a determination that metrics do not fall within predetermined threshold values after remediation;
wherein the one or more first metrics and the one or more second metrics each comprise at least one of pre-forward error correction ("FEC") error rates, post-FEC error rates, or bit error rates ("BERs").

18. A system, comprising:
one or more optical signal devices; and
a computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
based on a determination that one or more gaps of optical spectrum exist in a range of optical spectrum that contains one or more first media channels that support transmission of corresponding one or more first signals, determine a network wavelength service frequency assignment for shifting frequency of at least one first media channel among the one or more first media channels to optimize one or more spacings among the one or more first media channels in the range of optical spectrum for supporting transmission of one or more second signals;
cause the one or more optical signal devices to shift a center frequency of each of the at least one first media channel, based on the determined network wavelength service frequency assignment;
receive, from a spectrum analyzer, one or more measurements of the one or more first media channels of the range of optical spectrum; and
determine, whether the one or more gaps of optical spectrum exist in the range of optical spectrum based at least in part on the one or more measurements.

* * * * *